(12) United States Patent
Bergantz et al.

(10) Patent No.: US 11,334,865 B1
(45) Date of Patent: May 17, 2022

(54) TRANSACTION MANAGEMENT SYSTEM PROVIDING PAYMENT FUNCTIONALITY BETWEEN MOBILE DEVICES AND TOKEN IDENTIFIER DEVICES

(71) Applicant: TipTap Inc., Santa Clara, CA (US)

(72) Inventors: Nicholas Bergantz, Sunnyvale, CA (US); Eugenia Bergantz, Sunnyvale, CA (US)

(73) Assignee: TipTap Inc., Santa Clara, CA (US)

( * ) Notice: Subject to any disclaimer, the term of this patent is extended or adjusted under 35 U.S.C. 154(b) by 118 days.

(21) Appl. No.: 16/595,455

(22) Filed: Oct. 7, 2019

Related U.S. Application Data

(60) Provisional application No. 62/742,315, filed on Oct. 6, 2018.

(51) Int. Cl.
*G06Q 20/32* (2012.01)
*G06Q 20/38* (2012.01)

(52) U.S. Cl.
CPC ....... *G06Q 20/322* (2013.01); *G06Q 20/3821* (2013.01)

(58) Field of Classification Search
None
See application file for complete search history.

(56) References Cited

U.S. PATENT DOCUMENTS

| 11,037,136 B2* | 6/2021 | Rule | G06Q 20/3567 |
| 2017/0116596 A1* | 4/2017 | Tsui | G06Q 20/341 |
| 2017/0213206 A1* | 7/2017 | Shearer | H04L 9/0891 |
| 2020/0387887 A1* | 12/2020 | Rathod | G06F 16/9537 |

* cited by examiner

*Primary Examiner* — Narayanswamy Subramanian
(74) *Attorney, Agent, or Firm* — Adibi IP Group, PC; Amir V. Adibi; Andrew C. Palmer

(57) ABSTRACT

A method and system support payments between two entities using a mobile device and a token identifier device. A payment or gratuity action is initiated by a payer using their mobile device, such as mobile communication handset, to scan a token identifier stored in the payee's token identifier device. In one example, the token identifier device is an RFID or NFC type device. After the token identifier is obtained, the mobile device communicates the TokenID, gratuity amount, and payer authentication information to a transaction management system that validates and attempts to transfer funds between the two entities. In one example, the transaction management system is a server system that communicates over a TCP/IP network. The transaction management system sends a communication to the mobile device indicating whether or not the transfer was successful.

19 Claims, 21 Drawing Sheets

REGISTRATION WITH THE TRANSACTION MANAGEMENT SYSTEM

FIRST ENTITY PROVIDES PAYMENT INFORMATION
ONTO MOBILE DEVICE

OBTAIN TOKEN IDENTIFIER AND REGISTER WITH MOBILE DEVICE

REGISTRATION WITH THE TRANSACTION MANAGEMENT SYSTEM

MOBILE DEVICE AND TOKEN IDENTIFIER DEVICE

ACCOUNT FEATURES PROVIDED BY TRANSACTION MANAGEMENT SYSTEM

LANDING PAGE

MOBILE DEVICE SCANNING TOKEN IDENTIFIER DEVICE

USER INFORMATION OF PAYEE

USER CONFIGURATION

LIST OF USER PROFILES

PAYMENT CONFIGURATION

TOKEN IDENTIFIER CONFIGURATION

TRANSACTION HISTORY

TRANSACTION MANAGEMENT SYSTEM
(ANOTHER EMBODIMENT)

TRANSACTION MANAGEMENT SYSTEM PROVIDING PAYMENT FUNCTIONALITY BETWEEN MOBILE DEVICES AND TOKEN IDENTIFIER DEVICES

CROSS-REFERENCE TO RELATED APPLICATIONS

This application claims the benefit under 35 U.S.C. § 119 of U.S. provisional patent application Ser. No. 62/742,315, entitled "Transaction Management System Providing Payment Functionality Between Mobile Devices And Token Identifier Devices," filed on Oct. 6, 2018. The subject matter of U.S. provisional patent application Ser. No. 62/742,315 is incorporated herein by reference.

TECHNICAL FIELD

The described embodiments relate generally to mobile payments.

BACKGROUND INFORMATION

Gratuities or tips are often paid to people in recognition of their diligence or contribution. Food-related establishments, entertainment establishments, and lodging establishments often provide services or have service providers who are paid with tips. In addition, patrons may also wish to contribute charitable donations. Some services, such as WiFi, ought to be provided in exchange for payment but the fees are too minimal to justify having a mechanism in place to collect fees. Other services include valet services, attendants, and hotel maids. Often in these circumstances, patrons do not have cash readily available. Tourists also often do not have an opportunity to convert money into local currency. A more robust solution is desirable.

SUMMARY

A method and system support payments between two entities using a mobile device and a token identifier device. A payment or gratuity action is initiated by a payer using their mobile device, such as mobile communication handset, to scan a token identifier stored in the payee's token identifier device. In one example, the token identifier device is an RFID or NFC type device. After the token identifier is obtained, the mobile device communicates the token identifier (TokenID), gratuity amount, and payer authentication information to a transaction management system that validates and attempts to transfer funds between the two entities. In one example, the transaction management system is a server system that communicates over a TCP/IP network. The transaction management system sends a communication to the mobile device indicating whether or not the transfer was successful. If, for example, the first entity does not have sufficient funds, then the transfer will fail, but if the first entity does have sufficient funds, then the funds will be transferred to the second entity.

Before initiating transfers, the payee and payors are registered with the transaction management system. Payment identification, payer's mobile device authentication, and payee's registered TokenID(s) are registered with the transaction management system. This enables the transaction management system to maintain, receive, and process the payee payment push requests. The payee's TokenIDs are then distributed at the payees' business location or other appropriate locations. Because the TokenIDs are inexpensive and registered only to the payee, maintain no theft value and thus maybe left unattended.

The instant system provides substantial advantages over visual code or QR code payment systems. Such conventional QR code exchange systems are often difficult for users to use and result in frustrating experiences. QR code exchange systems employs different process that becomes cumbersome to the user because a visual scan must be precisely align. Additional hardware, such as a camera, is involved. The camera must decode the characters embedded in the image. If there is a mark or damage on the visual code, then the transaction cannot be carried out successfully. In addition, if there is a smudge on the lens of the camera, then the scan will not be accurate. QR code exchange systems take on damage, wear out, and need to be replaced. The instant system, on the other hand, employs NFC in one embodiment and can be encapsulated in a very thick plastic material that provides protection from the environment. This provides a significantly more reliable system.

In addition, the instant system provides seamless transactions providing significant advantages to the user's interactive experience with the system. By tapping the mobile device on the token identifier device, a simple and singular user action, the system triggers the exchange: immediate scanning of the token code and communication with a remote transaction system that initiates the transfer of funds. Because payment transactions can be triggered by physical gesture, such as tapping the mobile device on the token identifier device, the transaction management system, mobile device, and token identifier device form part of what is also referred to as the "TipTap Network".

In accordance with another novel aspect, each party registered with the system maintains the security of their financial information. No sensitive user payment data is shared outside the user phone or the TipTap Network. Only the payee can authorize funds to leave their account. The instant system provides a transfer of payment without jeopardizing security or risking financial information being obtained by malicious entities. Additionally, once the token identifier is registered to and associated with a user, the token identifier is locked to that user. The token identifier cannot be taken away from that user unless the user gives permission by intentionally unlocking the token.

In accordance with yet another novel aspect, the token identifier device is extremely low cost, durable, and adaptable. Each token identifier device costs a fraction of a typical POS terminal to the point of being disposable. The token identifier device is conformable to any physical shape that is aesthetically pleasing or designed for marketing purposes. For example, the token identifier device may be embedded in a poster, a flier, a business card, or other paper marketing related material. The token identifier device may be embedded in a good or product that corresponds to the circumstances of the transaction, for example, the token identifier device may be embedded in a guitar case or in a tip jar. In another embodiment, the token identifier device is embedded in a wearable, for example, the token identifier is embedded in a bracelet, a necklace, a ring, a badge, or a tipping hat.

In addition to handling payments between users, the transactional management system can securely perform predetermined functions after the transfer is validated. In one embodiment, after payment is validated, the system triggers a mechanical or digital action. For example, after payment validation, the system causes a network connected robot or an IoT (Internet of Things) device to do some work for the user, such as make a cup of coffee, clean a restroom, wash a vehicle, or perform other robot-work related functions. In another example, after payment is validated, the system causes a network connected machine to vend a soda, open a parking garage gate, dispense water, play a song on a juke box, provide photocopies or scanner function, or operate photo booths. In yet another example, after payment is validated, the system causes another phone operated by a recipient of funds to offer access into a venue, such as a bar or club, or provide a special recognition for having donated like a pin or a sticker. In yet another example, after payment is validated, the system acknowledges a payment for public transportation and permits the user to travel. The transaction management system can also be used to facilitate a silent auction where individuals view various items up for auction and tap their phones on token devices associated with auction items to adjust their bids. The transaction management system can also be used to provide information or credentials to access information in exchange for payments, such as WiFi, brochures, or tourist information. The transaction management system can also be used to pair two devices in exchange for payment, such as pairing over Bluetooth or WiFi. The transaction management system can also be used to reserve a public space, conference room, or open a public bathroom. The transaction management system eases the flow of money thereby enabling better use of community resources and increasing social benefits.

In another embodiment, a second entity, such as a service provider entity, obtains a token identifier device having a token ID. The token ID is supplied to a transaction management system. Next, the second entity configures selectable options, such as a menu, with the transaction management system. Next, a first entity, such as customer entity, obtains the token ID from the token identifier device. Next, the token ID is communicated from the device to the transaction management system. Next, the transaction management system responds by supplying the selectable options to the user device. Next, transaction information is communicated from the user device to the transaction management system. Next, the transaction information is supplied to the service providing entity. The service providing entity performs functions in accordance with the transaction information. Next, transaction and/or order confirmation is supplied from the transaction management system to the user device. In one example, the first entity and second entity interact with the transaction management system and perform the above functions via a mobile application that is provided by an entity that manages the transaction management system.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
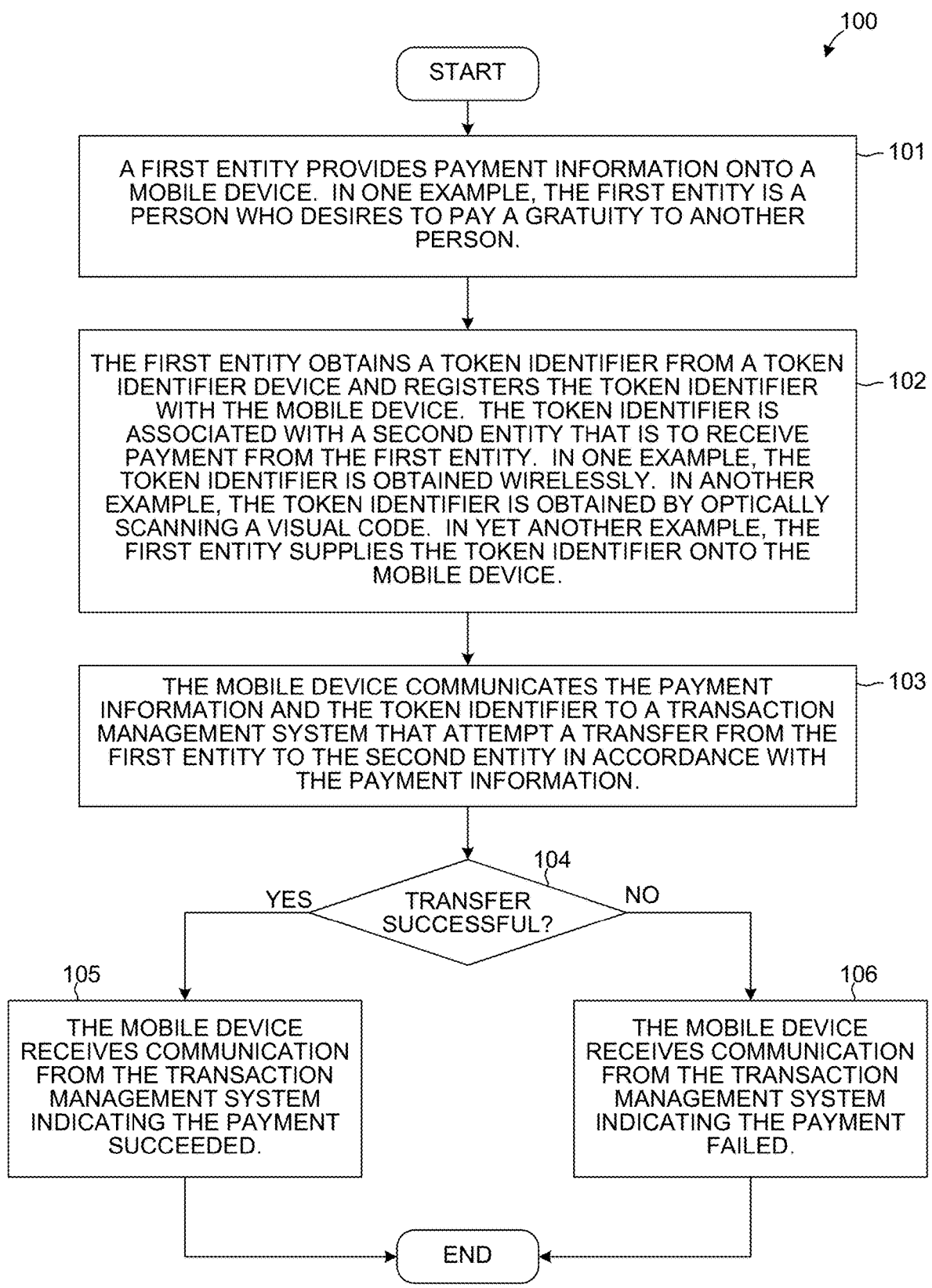
FIG. 1 is a flowchart of a method 100 in accordance with one novel aspect.
Figure 2:
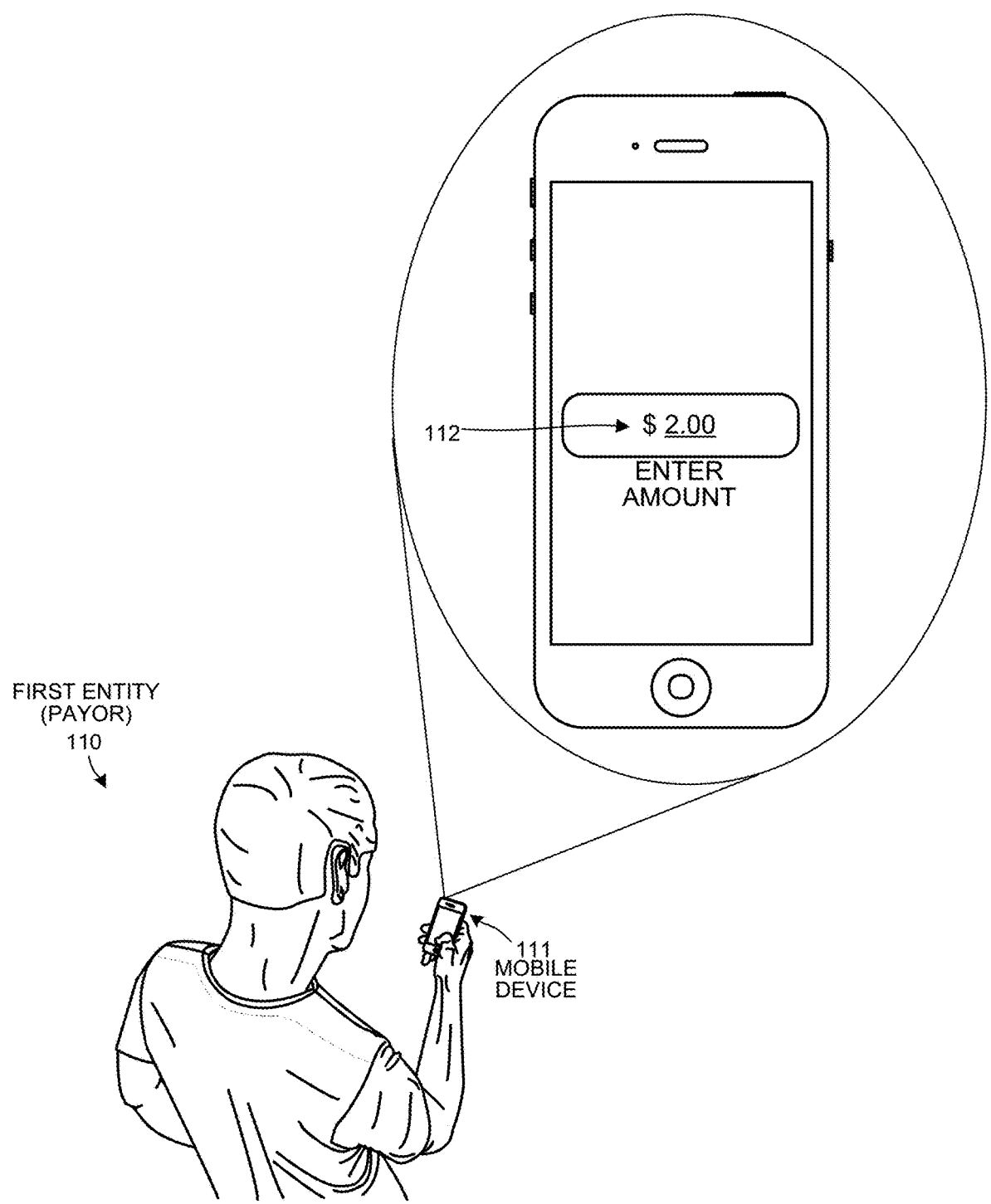
FIG. 2 is a diagram that shows how a first entity provides payment information onto a mobile device.

FIG. 1 is a flowchart of a method 100 in accordance with one novel aspect. In a first step (step 101), a first entity provides payment information onto a mobile device. In one example, the first entity is a person who desires to pay a gratuity to another person. For example, in FIG. 2 a first entity 110 or payor having a mobile device 111 desires to transfer money to another entity. The mobile device 111 is a mobile communication handset, a tablet, or other device capable of communicating over a network. The first entity 110 enters payment information, for example, the amount of money to be transferred. In this example, first entity 110 enters "$2.00" onto the user interface presented on the display of the mobile device.

Figure 3:
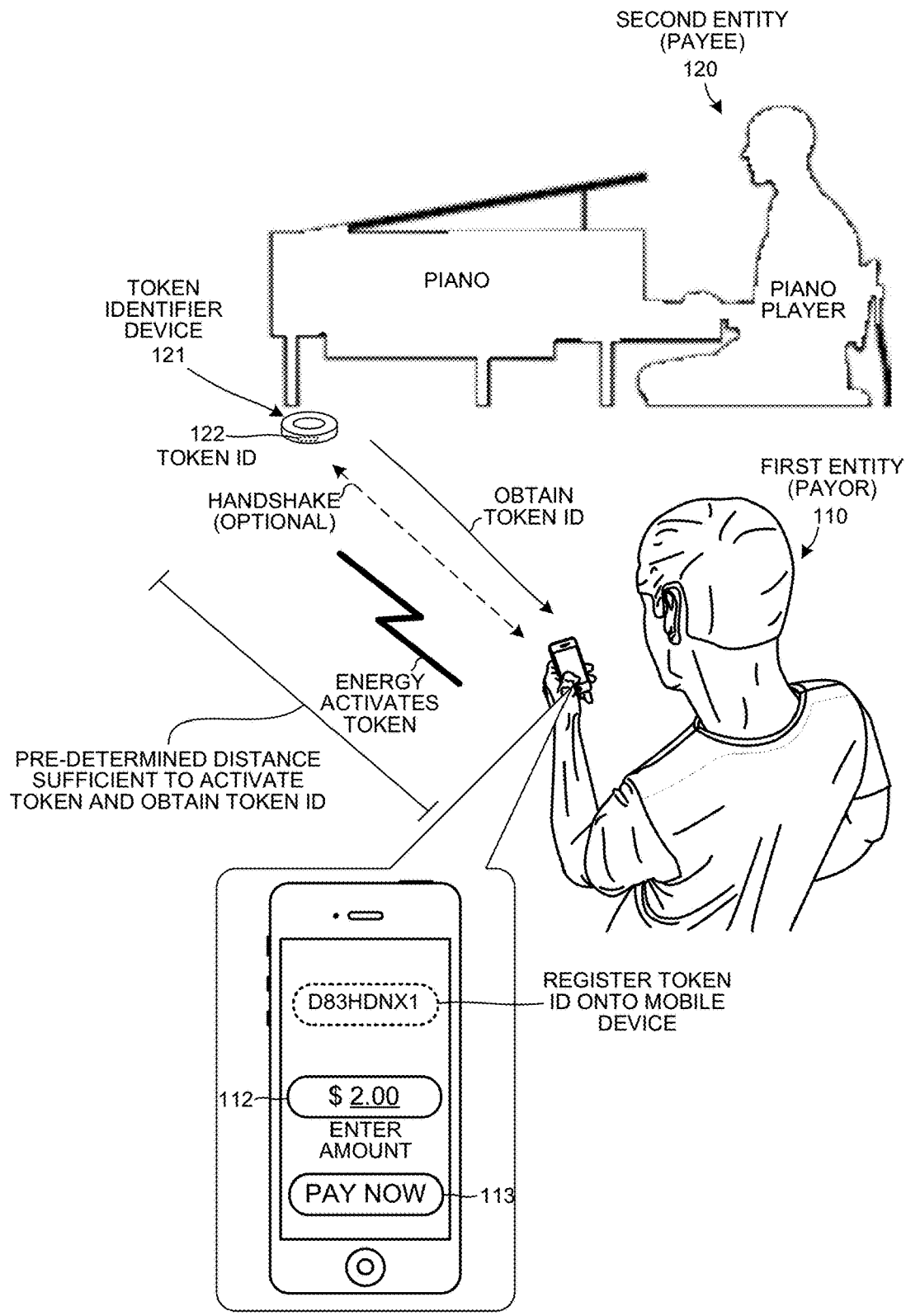
FIG. 3 is a diagram that shows how a token identifier is obtained from the token identifier device of the second entity and is registered with the mobile device of the first entity.

In a second step (step 102), the first entity obtains a token identifier from a token identifier device and registers the token identifier with the mobile device. The token identifier is associated with a second entity that is to receive payment from the first entity. In one example, the token identifier is obtained wirelessly. In another example, the token identifier is obtained by optically scanning a visual code. In yet another example, the first entity supplies the token identifier onto the mobile device. In the example of FIG. 3, the second entity 120 or payee has a token identifier device 121. The second entity 120 desires to receive money as appreciation for his/her musical abilities. In this example, the second entity 120 is a piano player.

To initiate the transfer, the first entity 110 brings mobile phone within a pre-determined distance, typically of less than 1-2 cm of the token identifier device 121. The first entity physically taps their mobile phone onto the token identifier device 121. Circuitry within the mobile device 111 generates energy that is detected and absorbed by the token identifier device 121. This energy causes the token identifier device 121 to be activated. Depending on the type of token identifier device employed, a handshake may occur. For example, if the token identifier device 121 is a Near Field Communication (NFC) token, then a handshake occurs between the mobile device 111 and the token identifier device 121. If the token identifier device 121 is a Radio Frequency Identification (RFID) device, then no handshake occurs. After the token identifier device 121 is activated, the circuitry within the mobile device 111 obtains the token identifier 122 from the token identifier device 121. At this point, haptic feedback in the form of a vibration or a sound from the phone would indicate to the first entity that the scan occurred successfully. The token identifier 122 is registered onto the mobile device 111. In this example, the token identifier 122 is a string "D83HDNX1".

In accordance with another novel aspect, the token identifier device 121 is not coupled to any dedicated power source and is significantly low cost. Unlike traditional point of sale (POS) terminals which require a dedicated power source, such as a power supply or battery, the token identifier device 121 does not require any dedicated power. The token identifier 121 is an extremely low-cost device providing a commercially cheap way for entities to obtain and receive payments. In typical transactions involving POS terminals and mobile devices, the POS terminal is powered by a dedicated power supply. The POS terminal includes an NFC module or other wireless mechanism that communicates with the mobile device. In such conventional transactions, the POS terminal communicates financial information related to the transaction, such as a payment amount. The mobile device receives the transaction information and confirms with a financial institution that the owner of the mobile device has the requisite funds to complete the transaction. Once confirmed, the mobile device communicates encrypted financial information to the POS terminal and the POS terminal completes the transaction.

On the other hand, the novel token identifier device 121 does not communicate any financial information to the mobile device 111. The mobile device 111 also does not communicate any financial information to the token identifier device 121. The only information communicated from the novel token identifier device 121 to the mobile device is the token identifier 122. The mobile device 111 does not communicate any information to the token identifier device 121. No sensitive information is exchanged between the mobile device 111 and the token identifier device 121.

Figure 4:
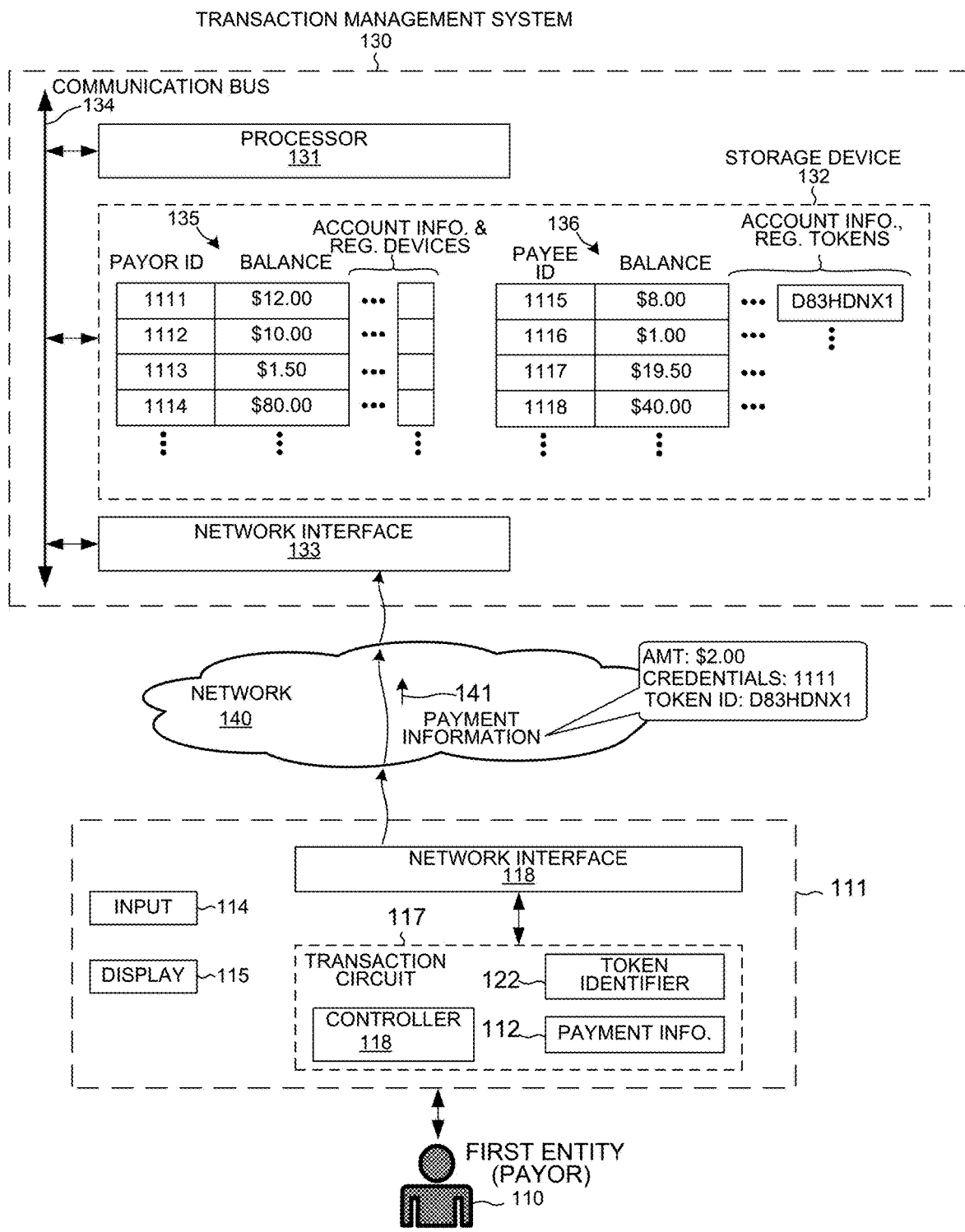
FIG. 4. is a diagram that shows how a mobile device communicates payment information and a token identifier to the transaction management system.

In a third step (step 103), the mobile device communicates the payment information and the token identifier to a transaction management system that attempt a transfer from the first entity to the second entity in accordance with the payment information. For example, in FIG. 4 the mobile device 111 communicates the payment information 112 ("$2.00"), security credentials (a userID "1111") of the first entity 110, and the token identifier 122 ("D83HDNX1") to the transaction management system 130. the transaction management system 130 uses this information to attempt to transfer funds from the first entity 110 to the second entity 120. In this example, the security credentials correspond to the userID "1111" of the first entity 110. It is understood that this is a simplified example presented for explanatory purposes. In actual implementation, the security credentials would not be a simple string, but would be realized using industry standard authentication methods, such as OAuth 2.0.

The transaction management system 130 comprises a processor 131, a storage device 132, a network interface 133, and a communication bus 134. Network interface circuit 133 is configured to communicate data across network 140. The storage device 132 stores account information for users, including payors and payees. Reference numeral 135 identifies a table associated with payors. Reference numeral 136 identifies a table associated with payees. It is understood that a user may be both a payor and a payee depending on the type of financial activity the user engages in.

The mobile device 111 comprises input hardware 114, display 115, transaction circuit 117, and a network interface circuit 118. The network interface circuit 118 is configured to communicate data across network 140. The transaction circuit 117 comprises a controller 118, an amount of memory that stores the token identifier 122 obtained from the token identifier device 121, and payment information 112 provided by the first entity 110.

Figure 5:
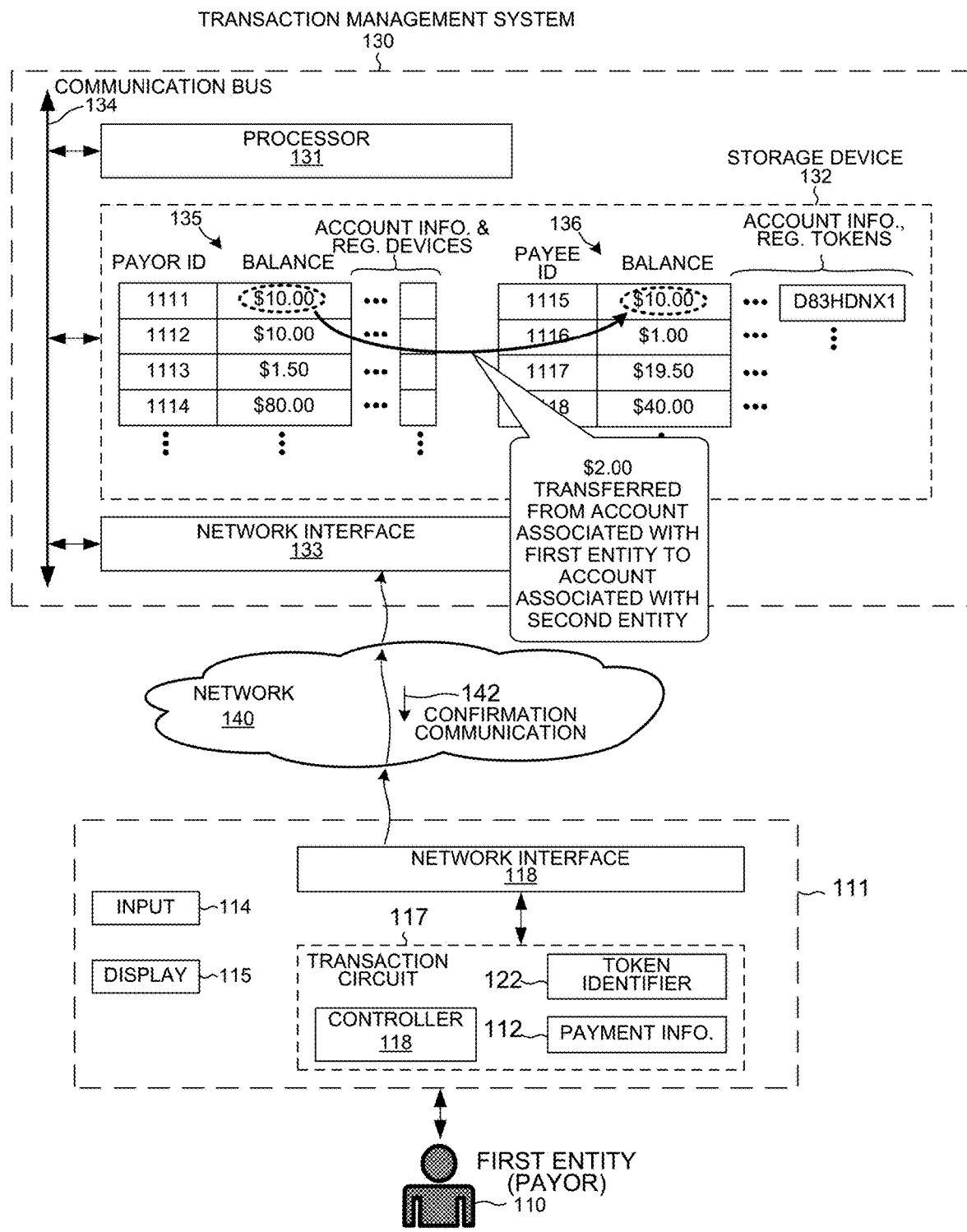
FIG. 5 is a diagram that shows how the transaction management system sends a confirmation communication to the mobile device indicating whether or not the payment was successful.

In a fourth step (step 104), a determination is made whether the transfer between the first entity 110 and the second entity 120 was successful. If the transfer is determined to have been successful, then the method proceeds to a fifth step (step 105). For example, in FIG. 5 a determination is made that the first entity 110 has sufficient funds in his/her account with an available balance of $10.00. Thus $2.00 are transferred from the account of the first entity 110 to the account of the second entity 120. Confirmation communication 142 indicate that payment was successful.

If, on the other hand, the transfer is determined to have failed, then the method proceeds to a sixth step (step 106). Although not illustrated in FIG. 5, if the first entity 110 had only $1.00 in his/her account, then the transfer would have failed and confirmation communication 142 would have reflected failure.

Figure 6:
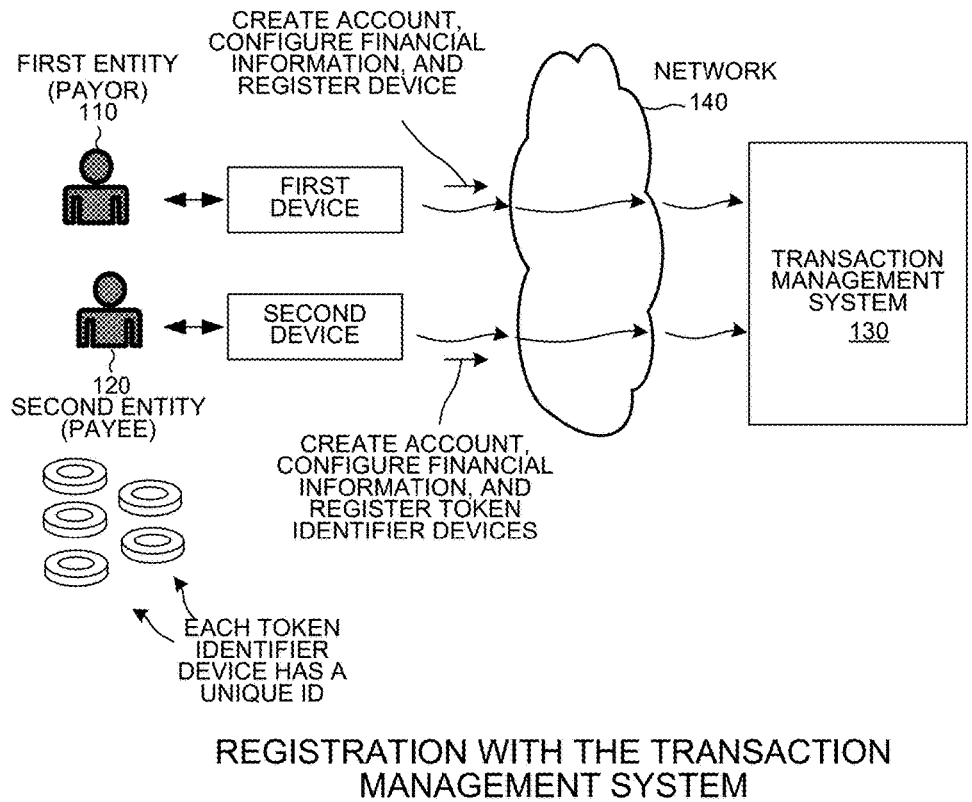
FIG. 6 is a diagram that shows how the first entity and second entity register and setup their accounts with the transaction management system.

FIG. 6 is a diagram that shows how the first entity and second entity register and setup their accounts with the transaction management system 130. The first entity 110 registers his/her account with the transaction management system 130 by creating an account, configuring financial information, and registered the mobile device(s). Configuring financial information involves transferring funds to the transaction management system 130 or providing a link between the transaction management system 130 and an account at a banking institution associated with the first entity 110. These funds are used to transfer to other entities.

The second entity 120 registers his/her account with the transaction management system 130 by creating an account, configuring financial information, and registering token identifier devices. Configuring financial information involves providing a link between the transaction management system 130 and an account at a banking institution associated with the first entity 110. This information is used to transfer money from the payees' account to an outside account associated with the second entity 120. Token registration involves the second entity 120 supplying the token identifier to the transaction management system 130 and associating that token identifier for each device with the account of the second entity 120.

Figure 7:
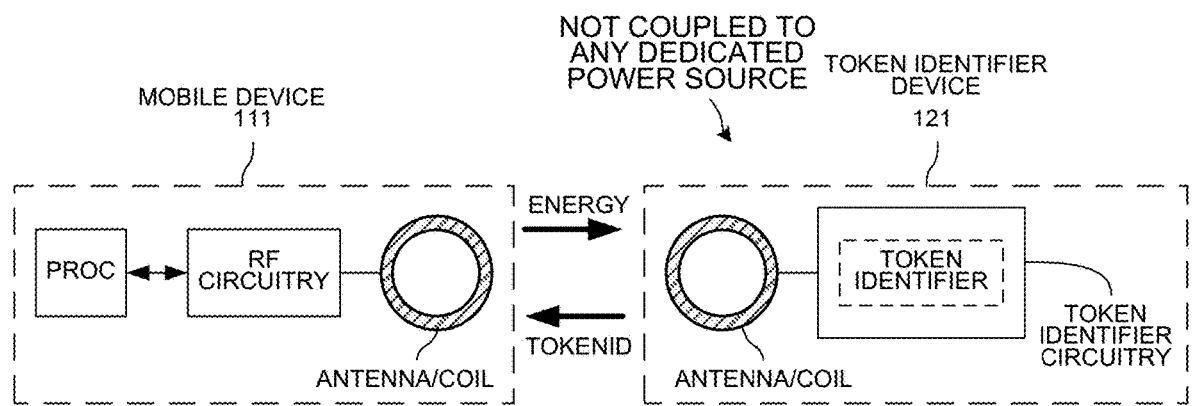
FIG. 7 is a block diagram of the structure of the mobile device and the token identifier device.

FIG. 7 is a block diagram of the structure of the mobile device 111 and the token identifier device 121. The mobile device 111 includes a processor or controller circuit, Radio Frequency (RF) circuitry, and an antenna or coil. The processor controls the RF circuitry. The RF circuitry uses the antenna to obtain the token identifier from the token identifier device 121.

The token identifier device 121 comprises an antenna or coil and token identifier circuitry. In one example, the token identifier circuitry includes a processor and an amount of non-volatile memory. In another example, the token identifier circuitry includes no processor. In yet another example, the token identifier device 121 includes a battery or capacitor used to supply circuitry internal to the token identifier device 121.

When the mobile device 111 is brought within a predetermined distance of the token identifier device 121, energy output from antenna or coil of the mobile device 111 is detected and absorbed by the antenna or coil of the token identifier device 121. This absorbed energy is sufficient to activate the token identifier circuitry within the token identifier device 121. Once activated, the mobile device 111 wirelessly reads the token identifier stored within the token identifier circuitry of the token identifier device 121.

Figure 8:
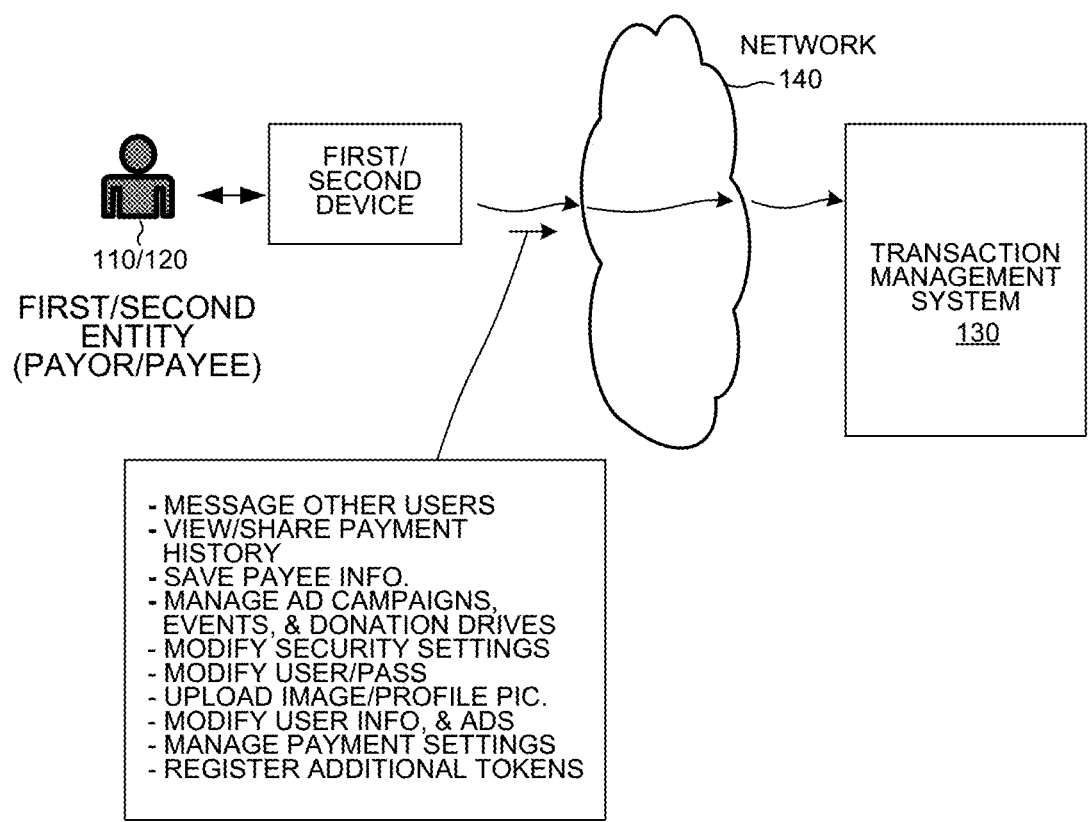
FIG. 8 is a diagram that shows various additional account features provided by the transaction management system.

FIG. 8 is a diagram that shows various additional account features provided by the transaction management system 130. For example, users may message other users registered with the transaction management system 130, view payment history, share payment history with others, save payee information, manage advertisement campaigns, events, and donation drives, modify security settings, modify username and password settings, upload images or profile pictures, modify user information and advertising content, manage payment settings, and register additional tokens.

Figure 9:
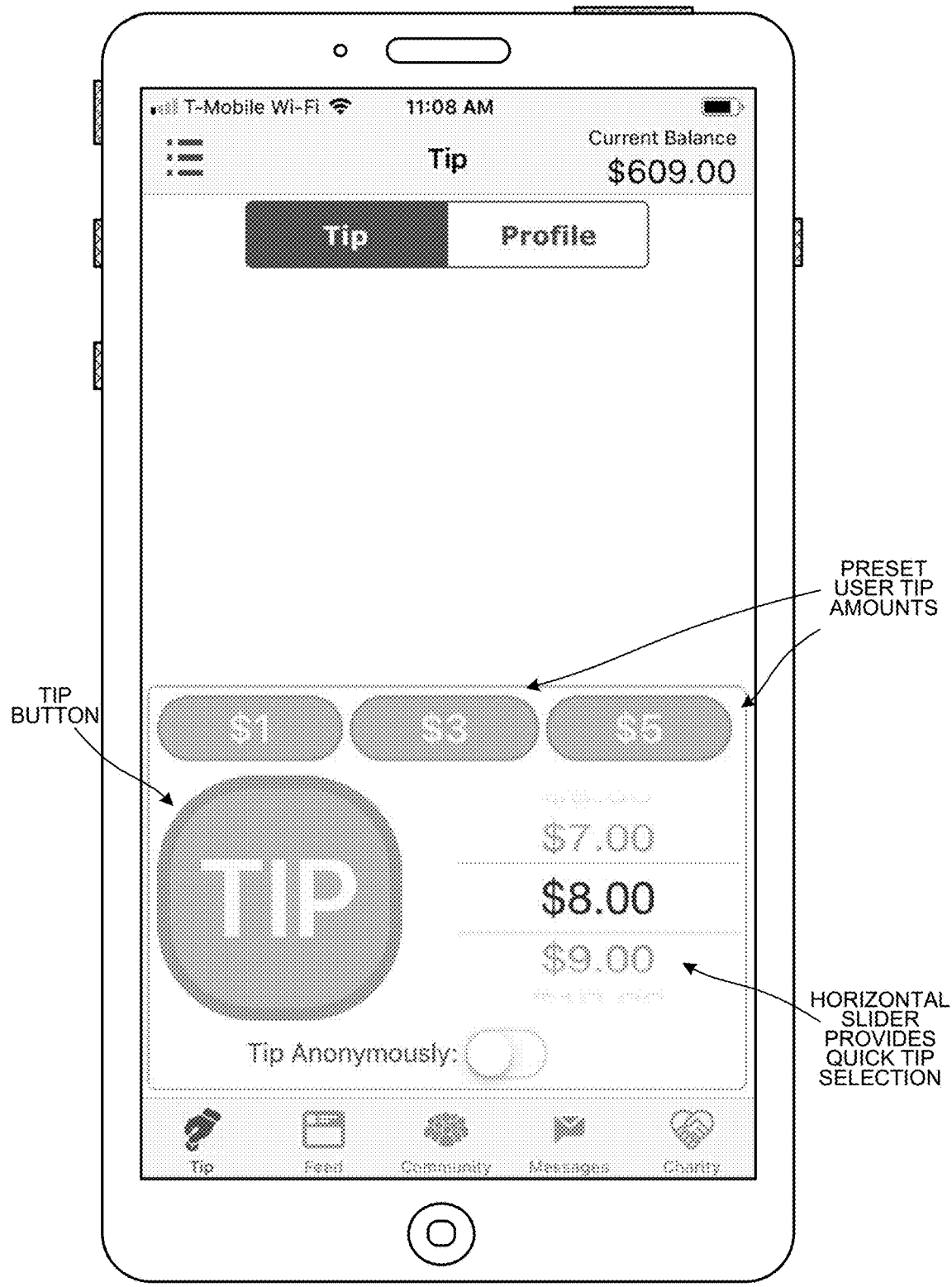
FIG. 9 is a diagram of a landing page on the mobile device after user (payor) login credentials are validated by the transaction management system.

FIG. 9 is a diagram of a landing page on the mobile device after user (payor) login credentials are validated by the transaction management system. The mobile device is running a mobile application configured to communicate with the transaction management system and with NFC circuitry of the mobile phone that scans token identifier devices. The landing page includes a tip button, preset user tip amounts, and horizontal slider of tip amounts that provide the user functionality to enter a desired tip amount.

Figure 10:
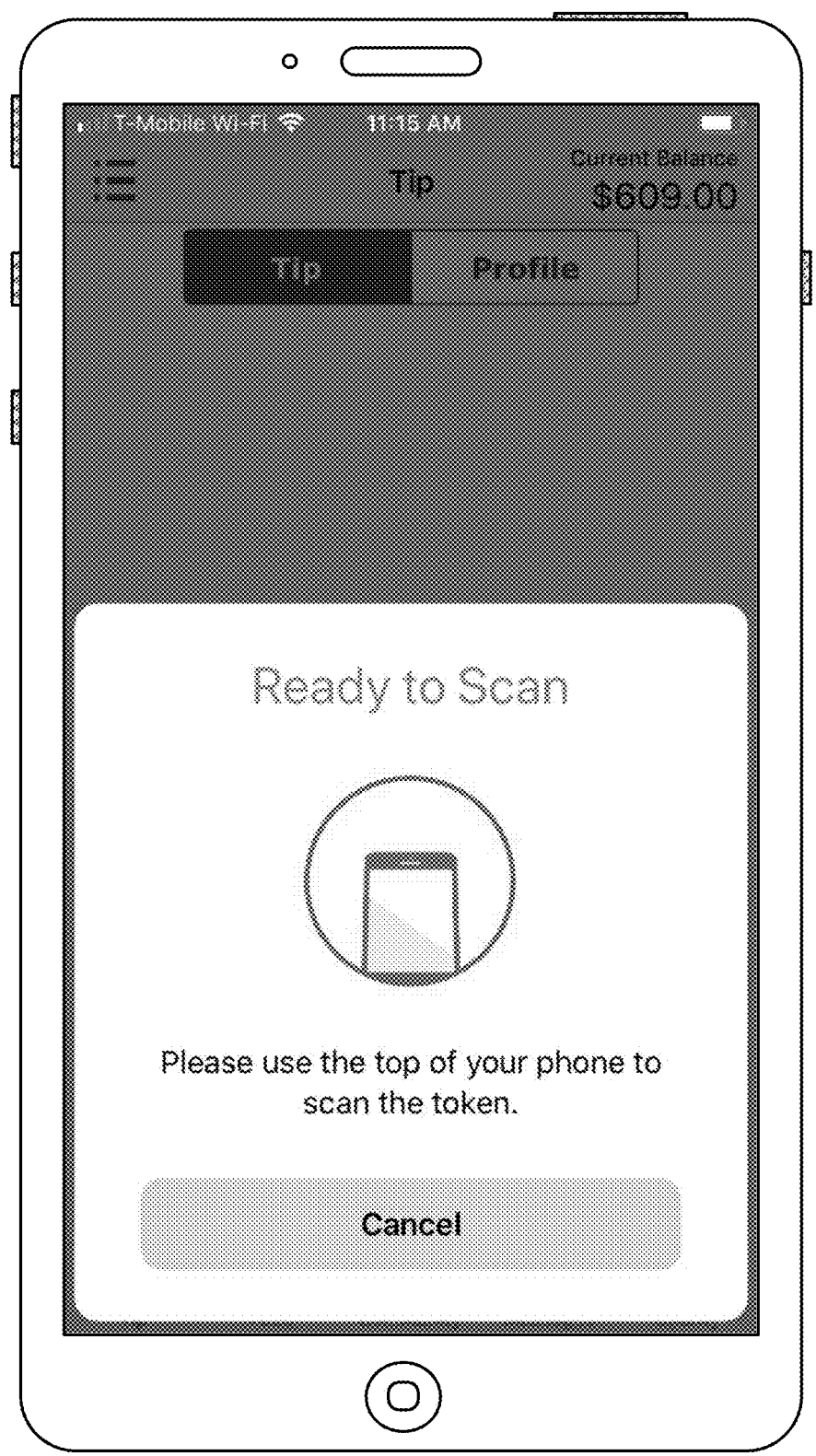
FIG. 10 is a diagram that shows the mobile device scanning an environment for token identifier devices.

FIG. 10 is a diagram that shows the mobile device scanning an environment for token identifier devices. After the tip button is activated, the mobile phone enters a scan mode and the NFC antenna is enabled. While the scan mode is active, if the phone is brought within proximity of the token identifier device, then the token ID stored by the token identifier device is immediately scanned. Once the token ID is scanned, the transaction is initiated and funds are transferred from the user (mobile phone owner) to the payee (token identifier device owner).

Figure 11:
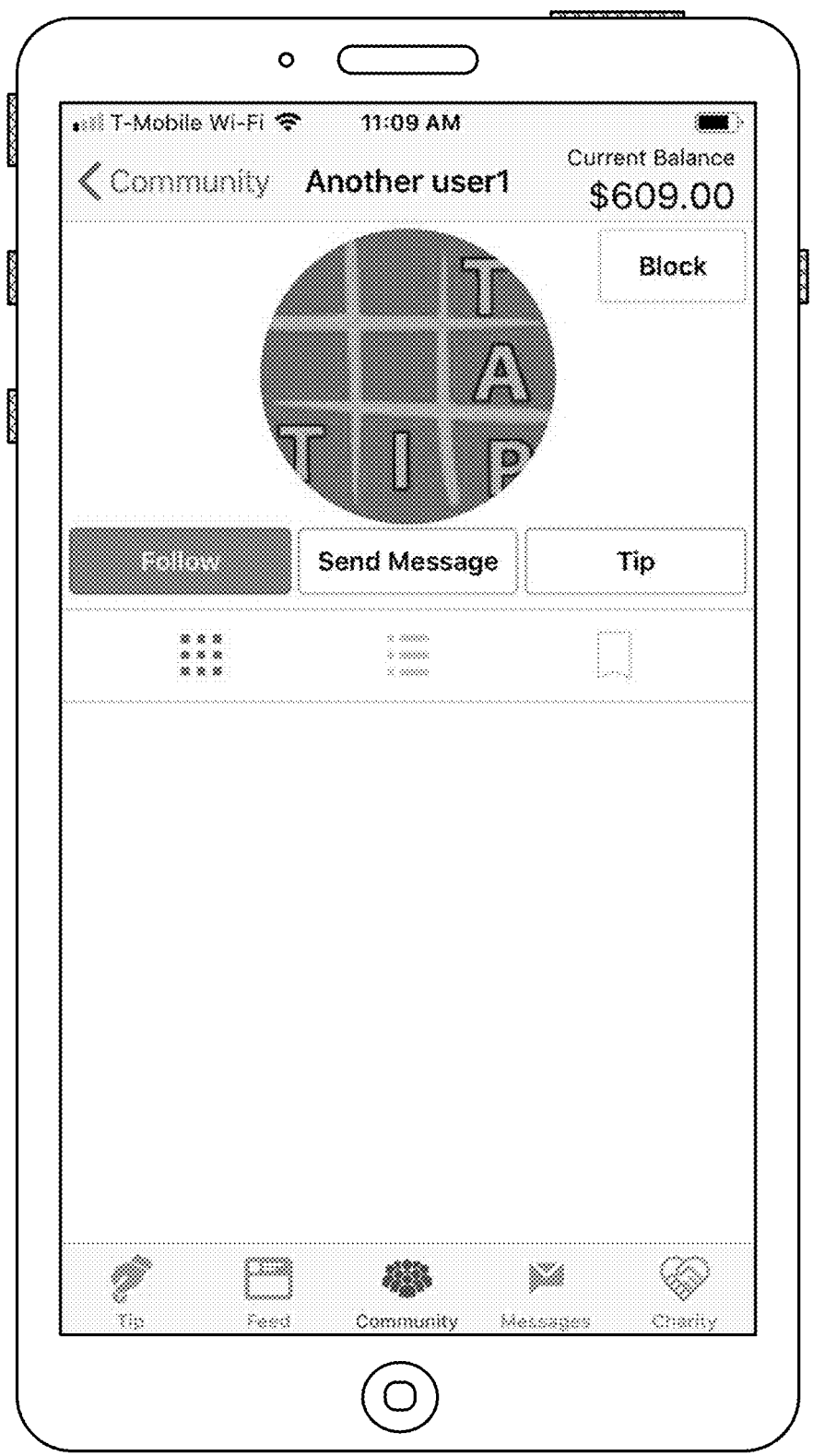
FIG. 11 is a diagram that shows a user profile page of the payee that is presented to the user (payor) after money is transferred.

FIG. 11 is a diagram that shows a user profile page of the payee that is presented to the user (payor) after money is transferred. Once the transaction is completed, the user (payor) is directed to the profile page of the payee. Here, the user (payor) can add, follow, save, block, tip again, view feed, and/or send messages to the payee.

Figure 12:
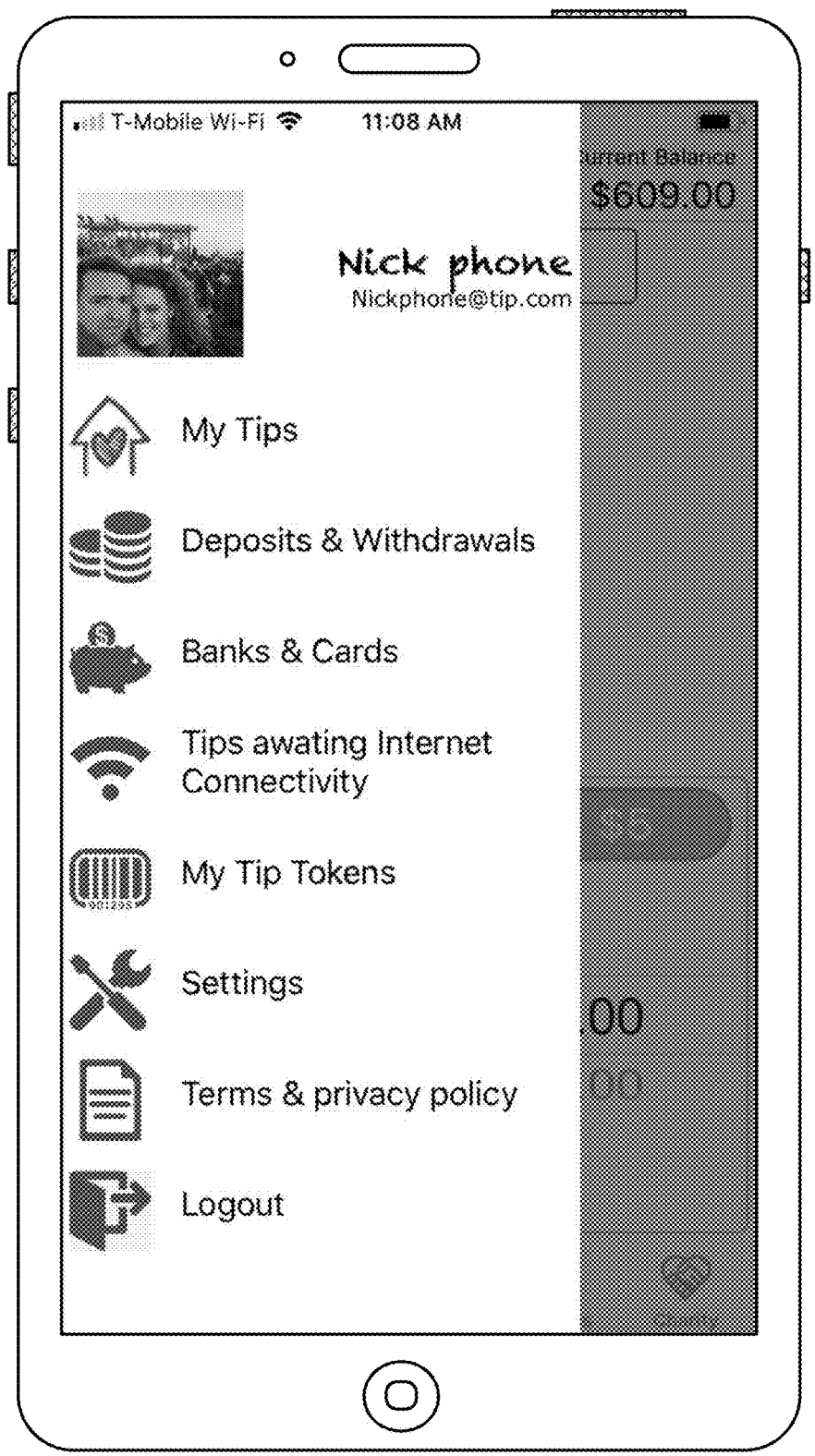
FIG. 12 is a diagram that shows a user setting sliding panel overlay.

FIG. 12 is a diagram that shows a user setting sliding panel overlay. This panel is activated by swiping right on the left side of the screen. This overlay provides the user options to view or edit their own profile, add bank cards, add or edit their token identifiers, view payment history of received or sent payments, edit settings such as login credentials and notification settings, and transfer funds to other banking institutions such as their personal checking account.

Figure 13:
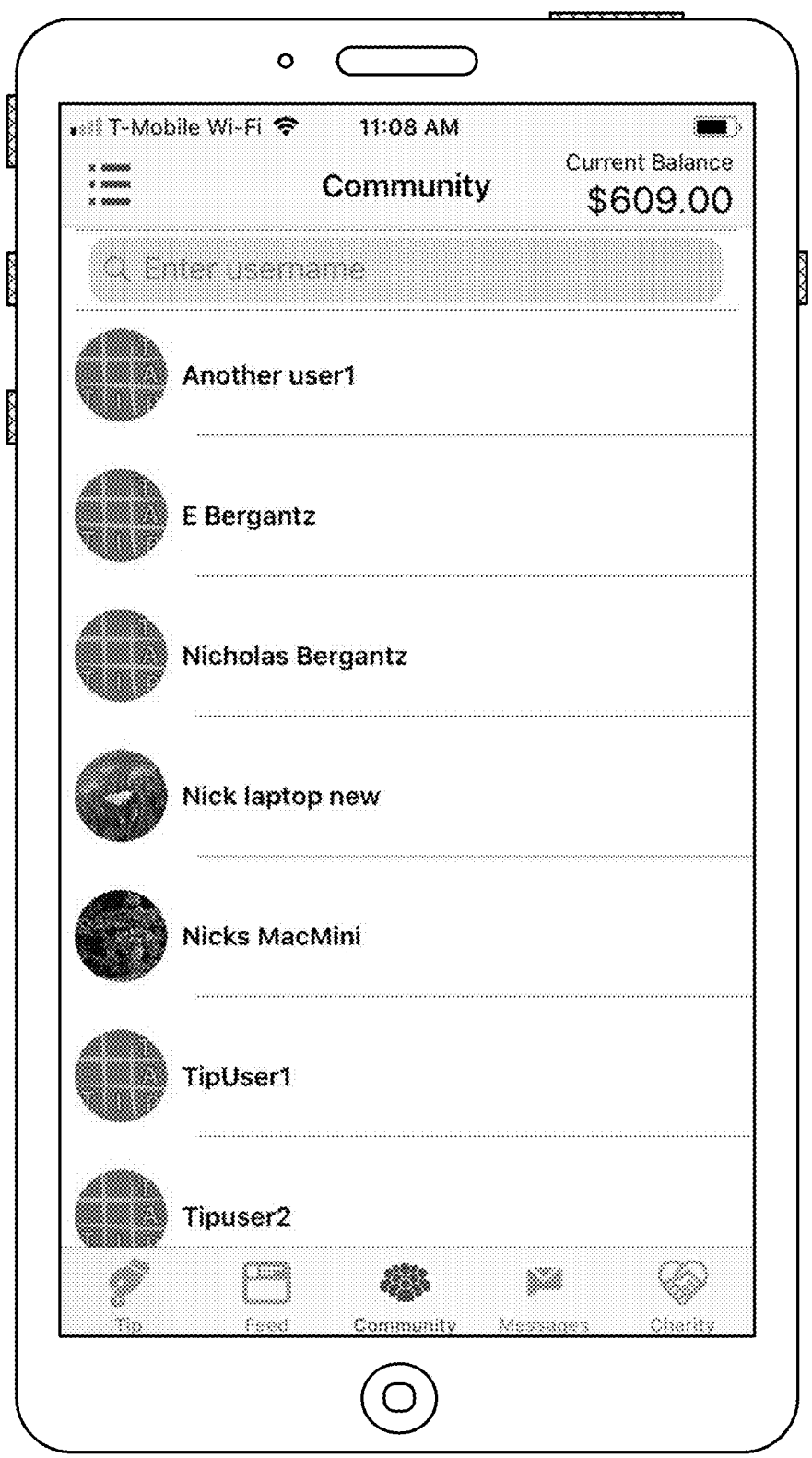
FIG. 13 is a diagram that shows a list of user profiles of users that are registered with the transaction management system.

FIG. 13 is a diagram that shows a list of user profiles of users that are registered with the transaction management system. Here, users can search for other users registered with the system, scroll through followed users, and follow new users. Selecting a user on the list directs the user to the corresponding user profile of the selected user.

Figure 14:
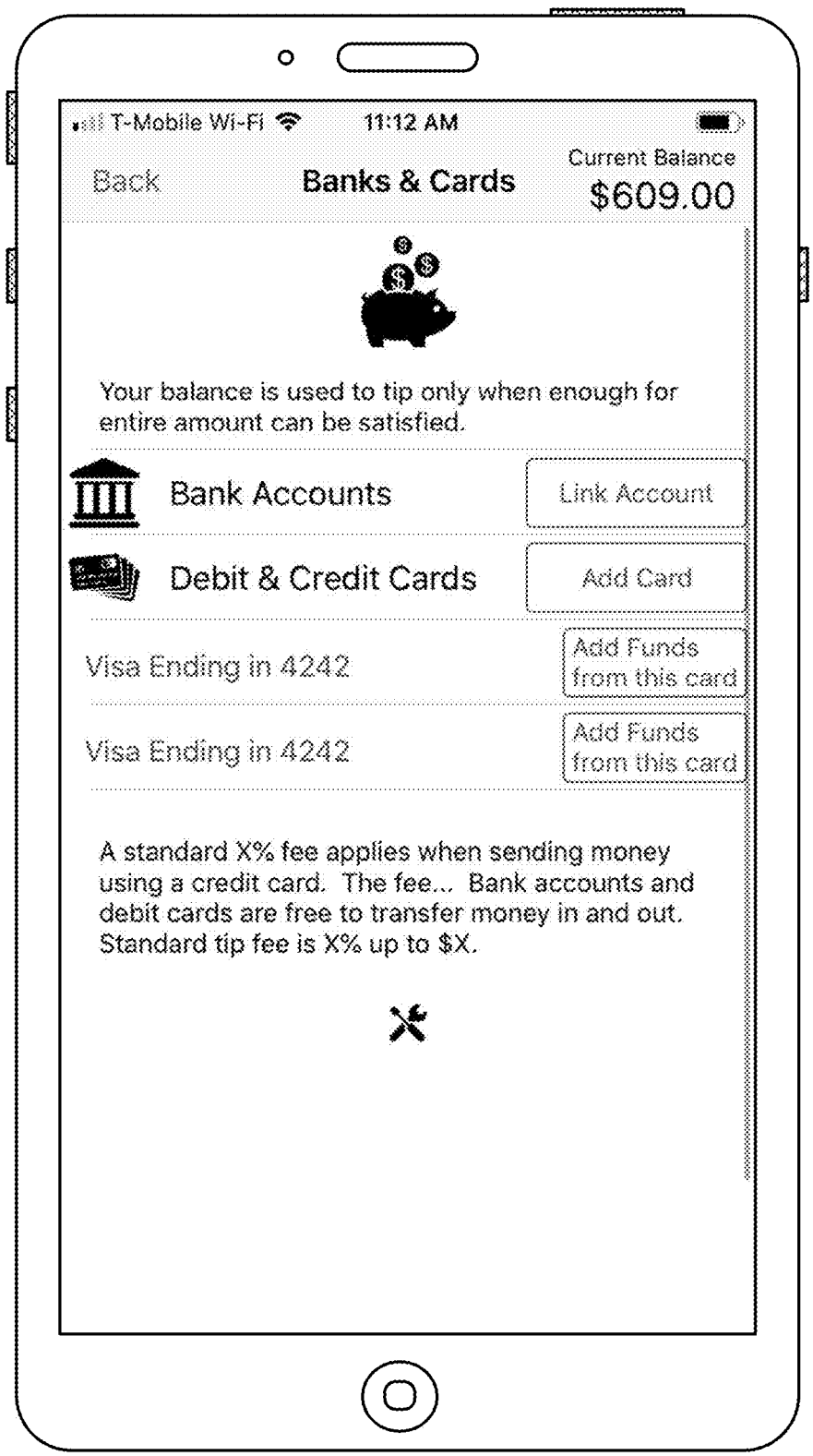
FIG. 14 is a diagram that shows payment settings of the user.

FIG. 14 is a diagram that shows payment settings of the user. Bank cards or ACH can be added, modified or deleted. In addition, funds can be deposited or withdrawn.

Figure 15:
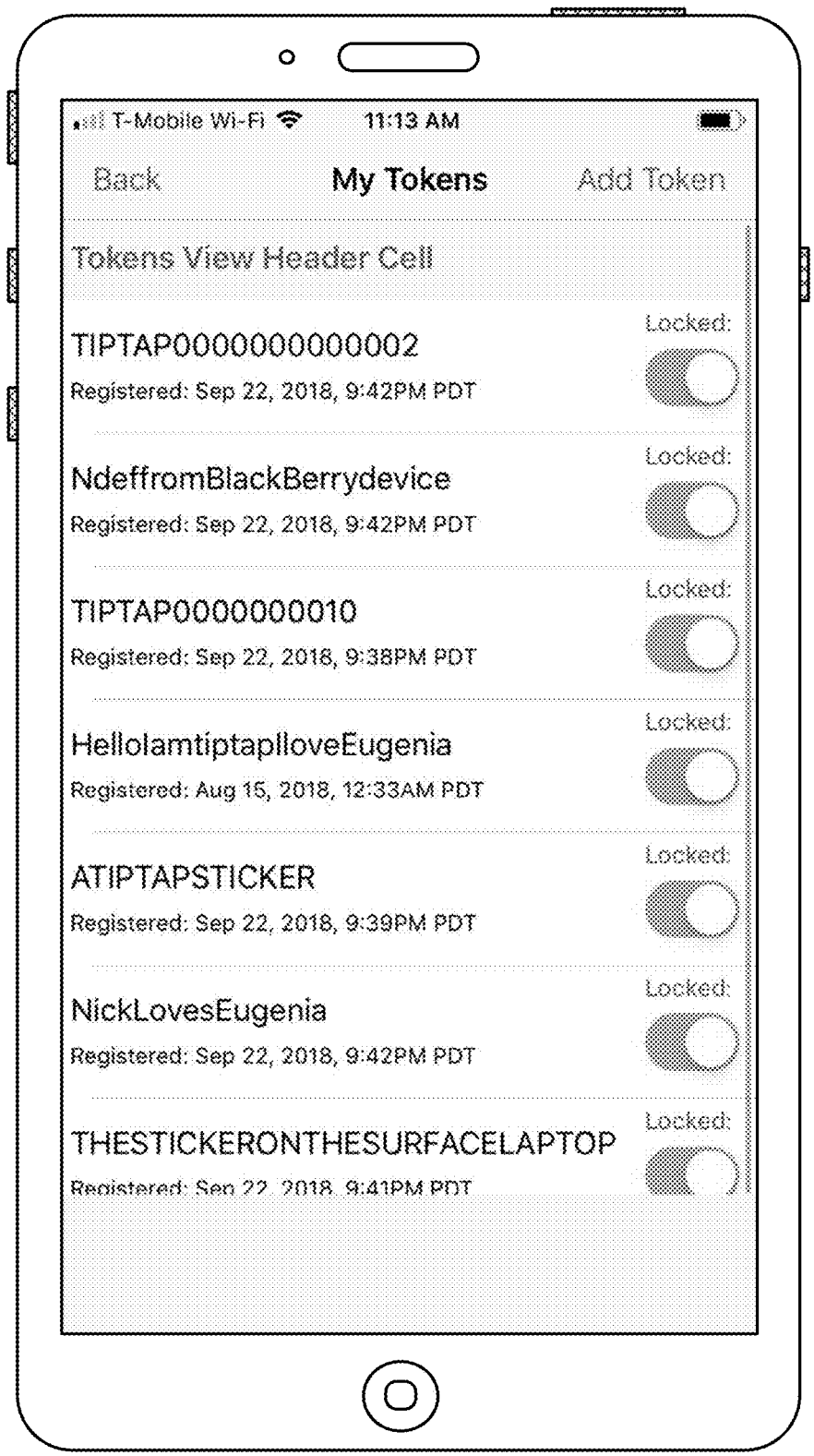
FIG. 15 is a diagram that shows how token identifiers are configured.

FIG. 15 is a diagram that shows how token identifiers are configured. A list of token identifiers registered to the user are presented. Here, the user is presented with options to delete, add, view, and/or lock or unlock token identifiers.

Figure 16:
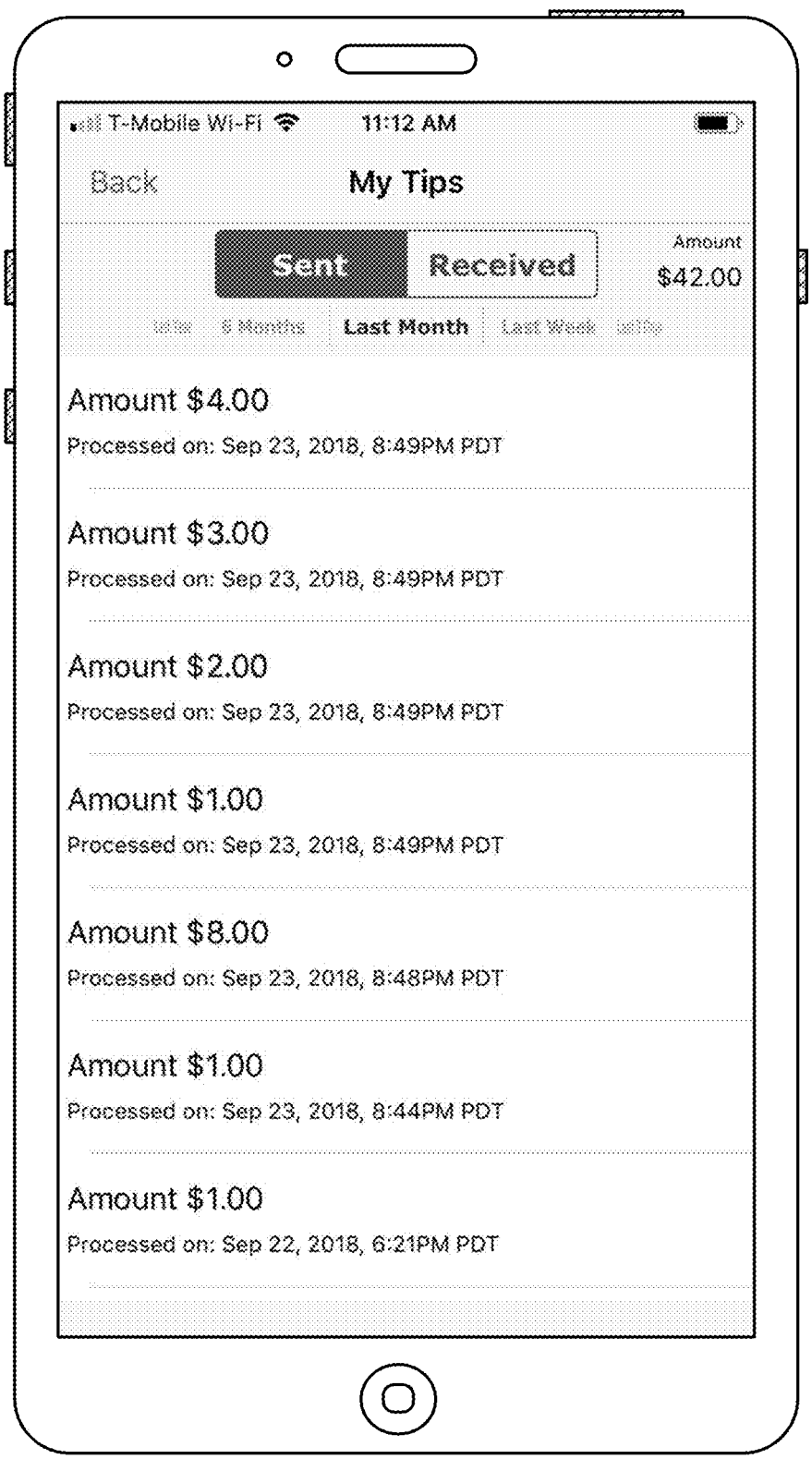
FIG. 16 is a diagram that shows transaction history of a user.

FIG. 16 is a diagram that shows transaction history of a user. There user is presented with a List of all tips received and sent. Optional filters are provided that provide searching of transfers by date, location, amounts, or users.

Figure 17:
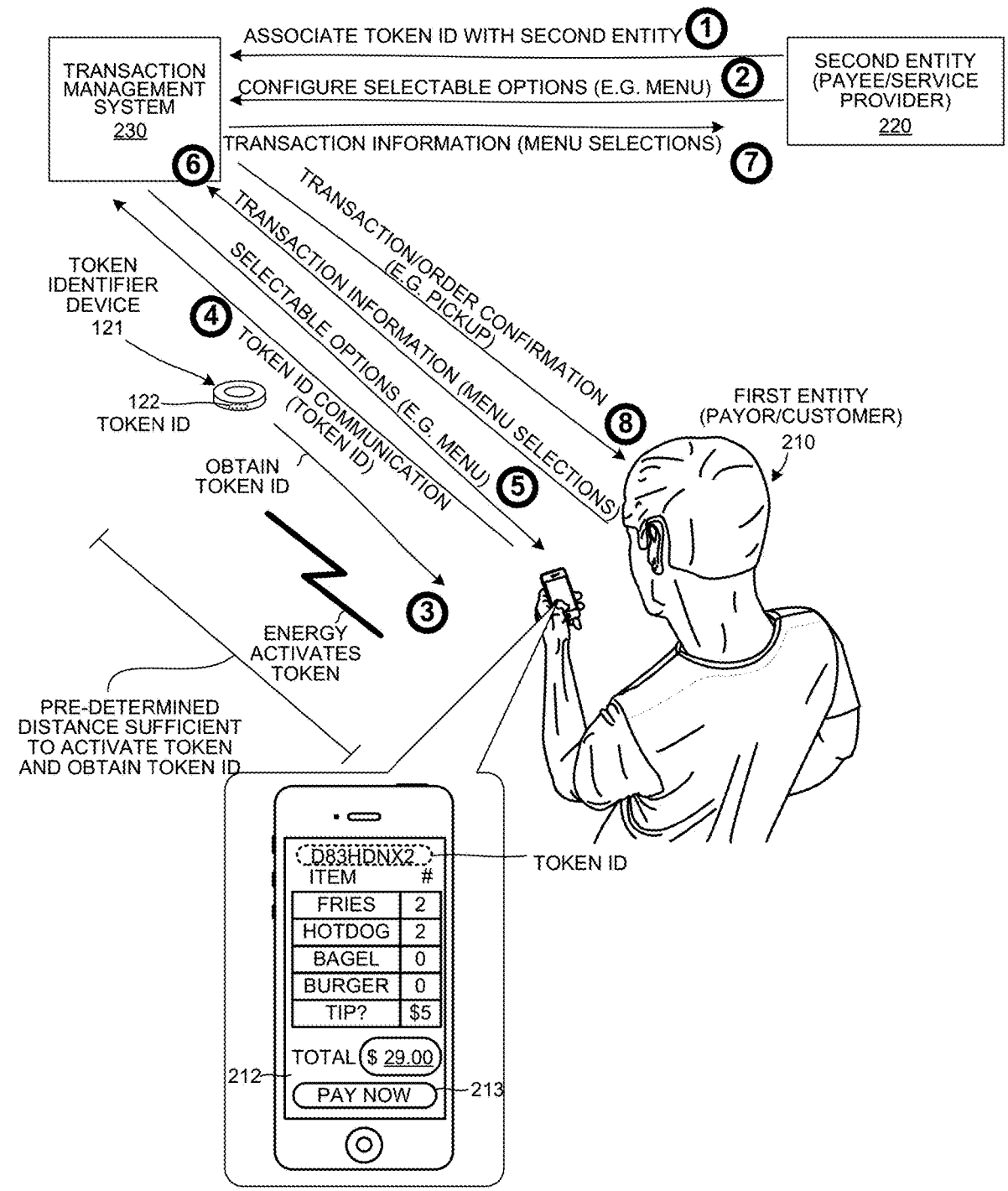
FIG. 17 is a diagram of another embodiment of a transaction management system 230.

FIG. 17 is a diagram of another embodiment of a transaction management system 230. First (#1), a second entity 220, such as a service provider entity, obtains a token identifier device having a token ID. The token ID is supplied to the transaction management system 230. Next (#2), the second entity 220 configures selectable options, such as a menu, with the transaction management system 230. In the case of a service provider that provides food, the selectable options are a menu. A service provider may choose to register multiple different token identifiers and have different types of menu items associated with different token IDs. For example, a service provider with an extensive drink menu may register a token ID with only drinks options and register another token ID with only food options.

Next (#3), a first entity, such as customer entity obtains the token ID 122 from the token identifier device 121. In one example, the token ID 122 is obtained by "tapping" their mobile device against the token identifier device 121. In another example, the customer entity 210 reads the token ID 122 and inputs the token ID directly into their device. In another example, the customer entity 210 scans a visual code (e.g., QR code) on the token identifier device 121. Next (#4), the token ID is communicated from the device to the transaction management system 230. Next (#5), the transaction management system 230 responds by supplying the selectable options to the user device. In one example, the transaction management system 230 performs a lookup to obtain the configured selectable options associated for that particular token ID. Next (#6), transaction information is communicated from the user device to the transaction management system 230. In one example, the transaction information includes the selected items and the quantity of each. Next (#7), the transaction information is supplied to the service providing entity 220. The service providing entity 220 performs functions in accordance with the transaction information. Next (#8), transaction and/or order confirmation is supplied from the transaction management system 230 to the user device.

Figure 18:
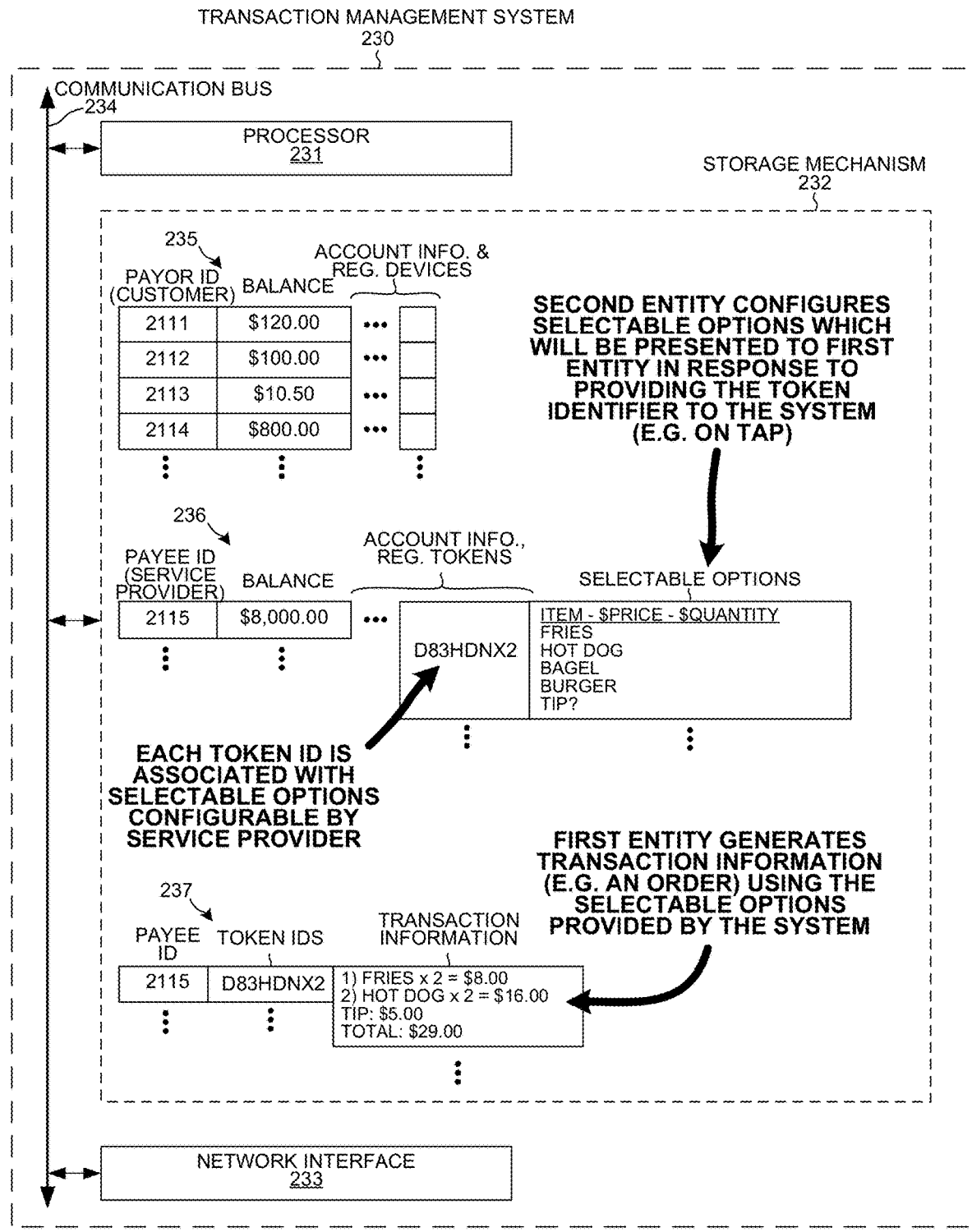
FIG. 18 is a detailed diagram of the transaction management system 230.

FIG. 18 is a detailed diagram of the transaction management system 230. The transaction management system 230 comprises a processor 231, a storage device 232, a network interface 233, and a communication bus 234. Network interface circuit 233 is configured to communicate data across network 140. The storage device 232 stores account information for users, including payors and payees, selectable options, and transaction information. Reference numeral 235 identifies tables in which the customer entity 210 information is stored within the storage device 232.

Reference numeral 236 identifies tables in which the service provider entity 220 information is stored within the storage device 232. Reference numeral 237 identifies tables in which the transaction information is stored within the storage device 232.

Figure 19:
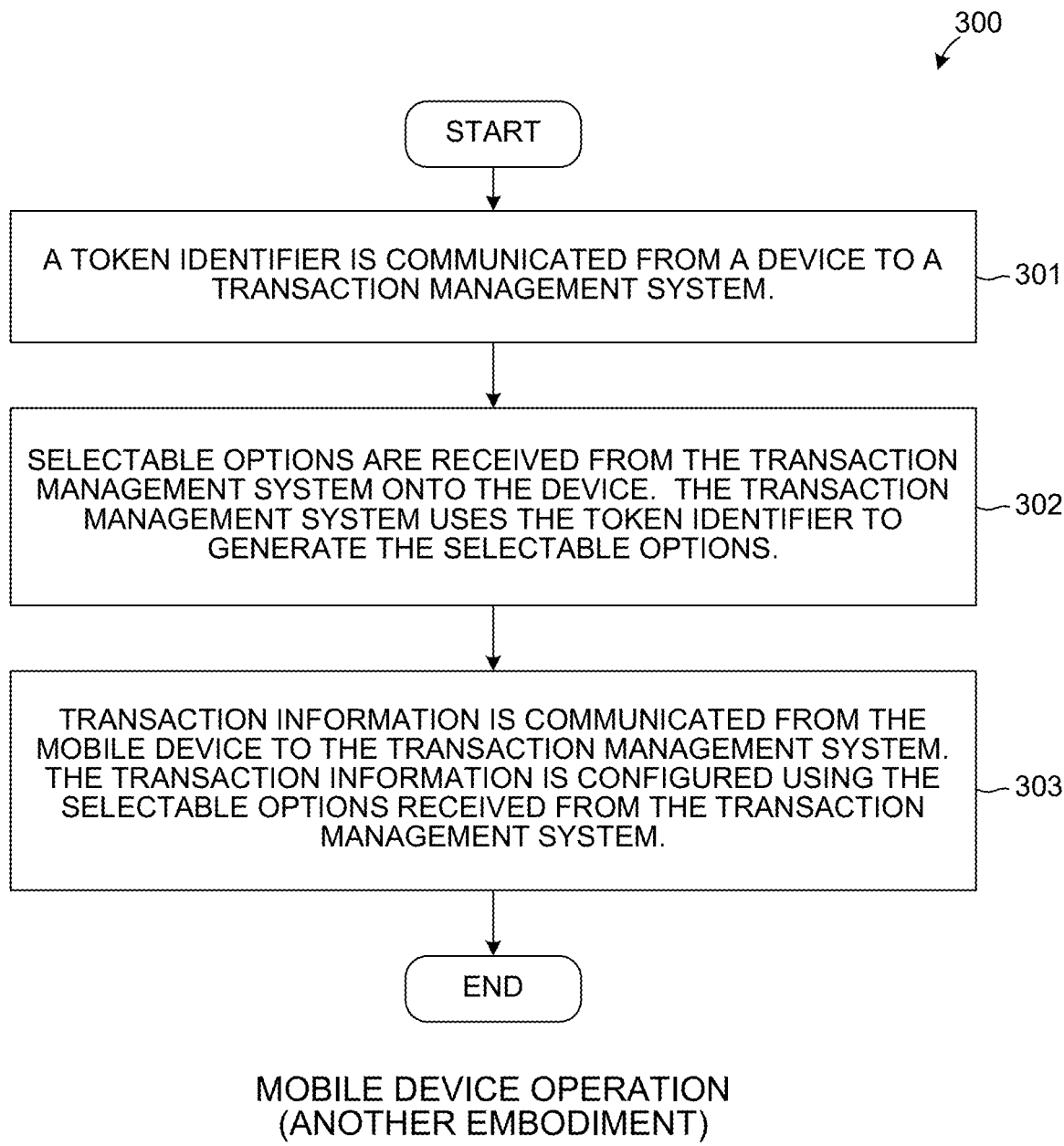
FIG. 19 is a flowchart of a method 300.

FIG. 19 is a flowchart of a method 300. In a first step (step 301), a token identifier is communicated from a device to a transaction management system. In a second step (step 302), selectable options are received from the transaction management system onto the device. The transaction management system uses the token identifier to generate the selectable options. In a third step (step 303), transaction information is communicated from the mobile device to the transaction management system. The transaction information is configured using the selectable options received from the transaction management system.

Figure 20:
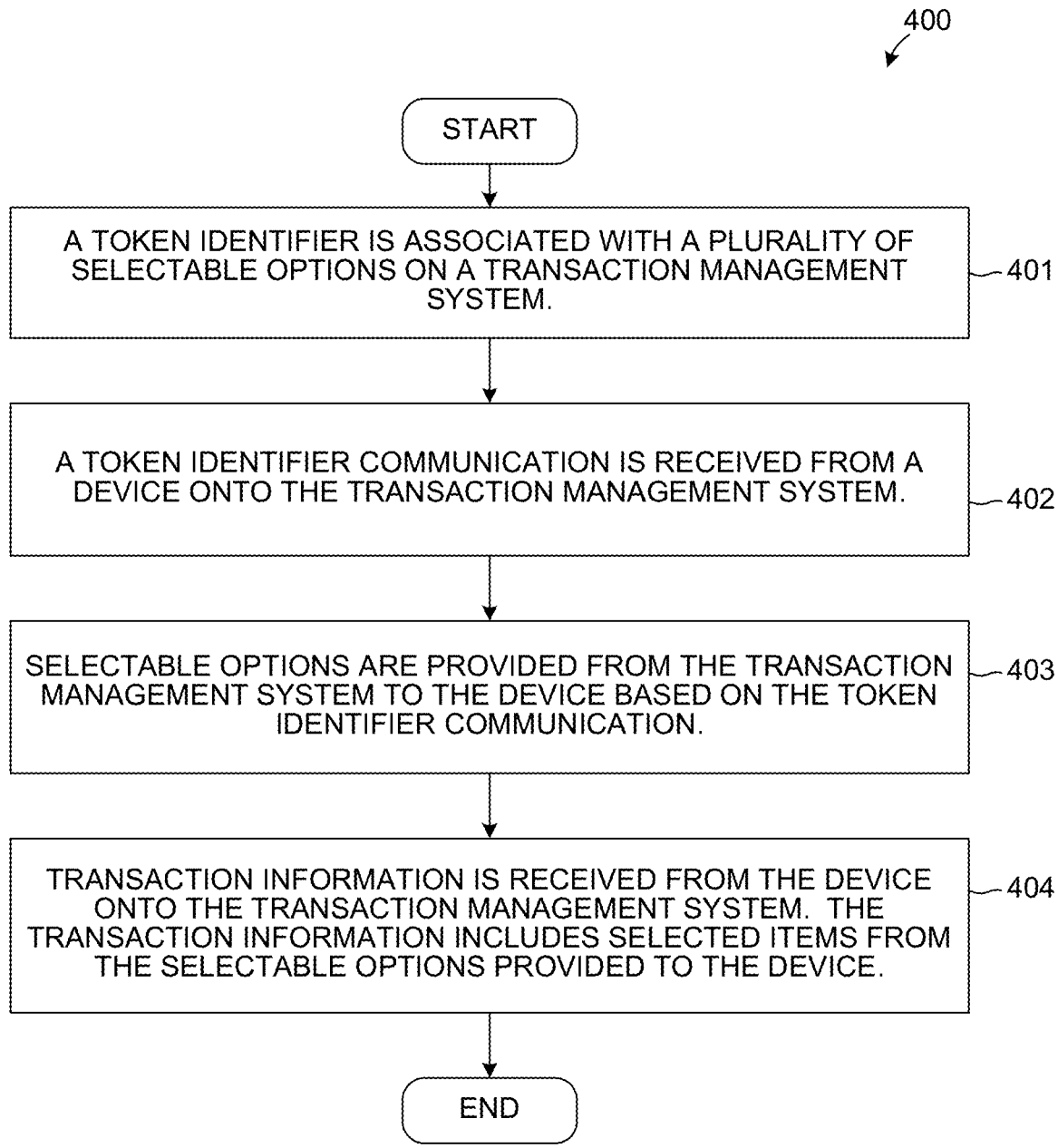
FIG. 20 is a flowchart of a method 400.

FIG. 20 is a flowchart of a method 400. In a first step (step 401), a token identifier is associated with a plurality of selectable options on a transaction management system. In a second step (step 402), a token identifier communication is received from a device onto the transaction management system. In a third step (step 403), selectable options are provided from the transaction management system to the device based on the token identifier communication. In a fourth step (step 404), transaction information is received from the device onto the transaction management system. the transaction information includes selected items from the selectable options provided to the device.

Figure 21:
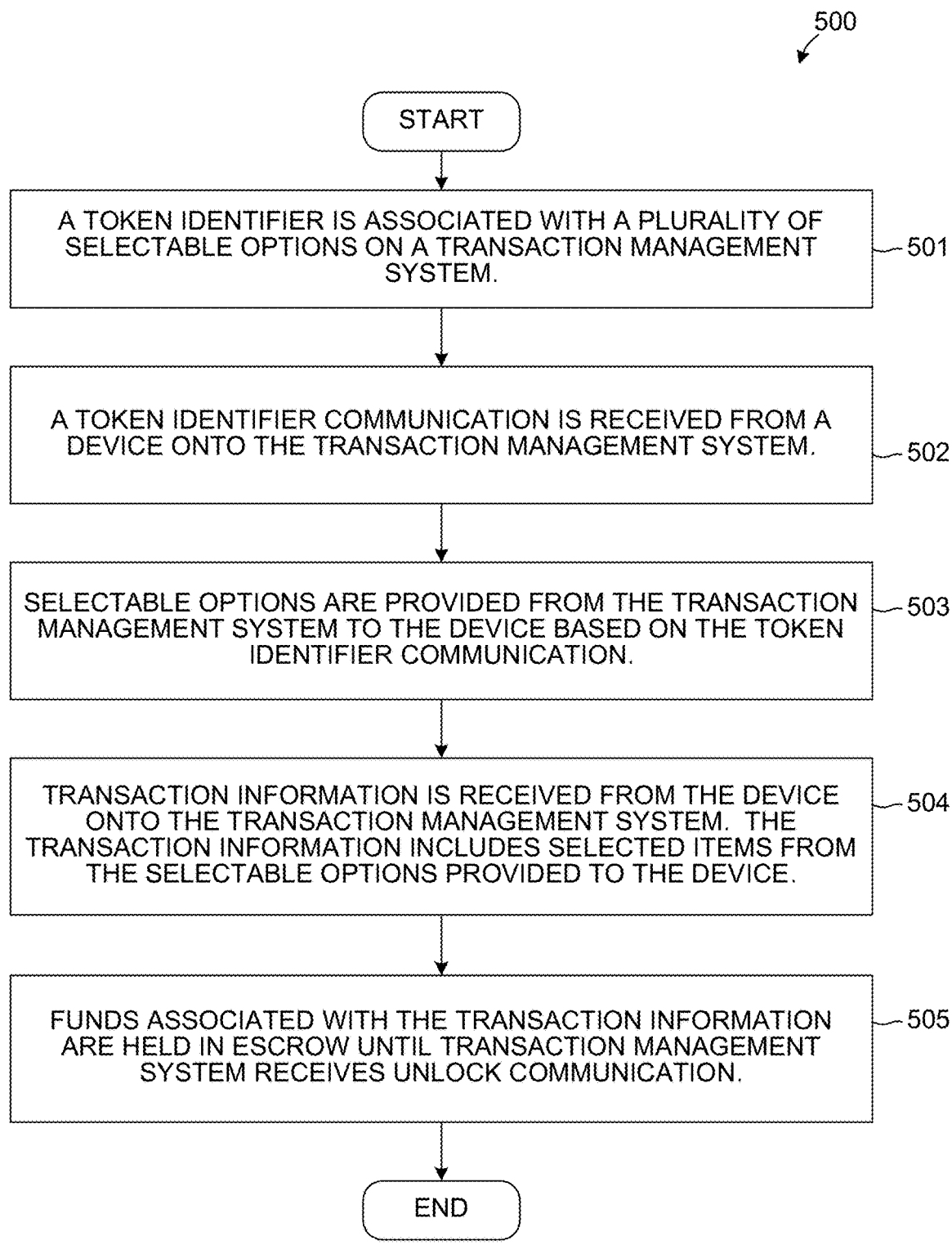
FIG. 21 is a flowchart of a method 500.

FIG. 21 is a flowchart of a method 500. The method 500 includes an escrow step in which the transaction management system provides escrow functionality between the first entity and the second entity. The first entity can supply the funds held in escrow by the entity providing the transaction management system. Once both the first and second entity unlock the escrow, then the funds are transferred to the second entity.

In a first step (step 501), a token identifier is associated with a plurality of selectable options on a transaction management system. In a second step (step 502), a token identifier communication is received from a device onto the transaction management system. In a third step (step 503), selectable options are provided from the transaction management system to the device based on the token identifier communication. In a fourth step (step 504), transaction information is received from the device onto the transaction management system. the transaction information includes selected items from the selectable options provided to the device. In a fifth step (step 505), funds associated with the transaction information are held in escrow until transaction management system receives unlock communication.

Figure 22:
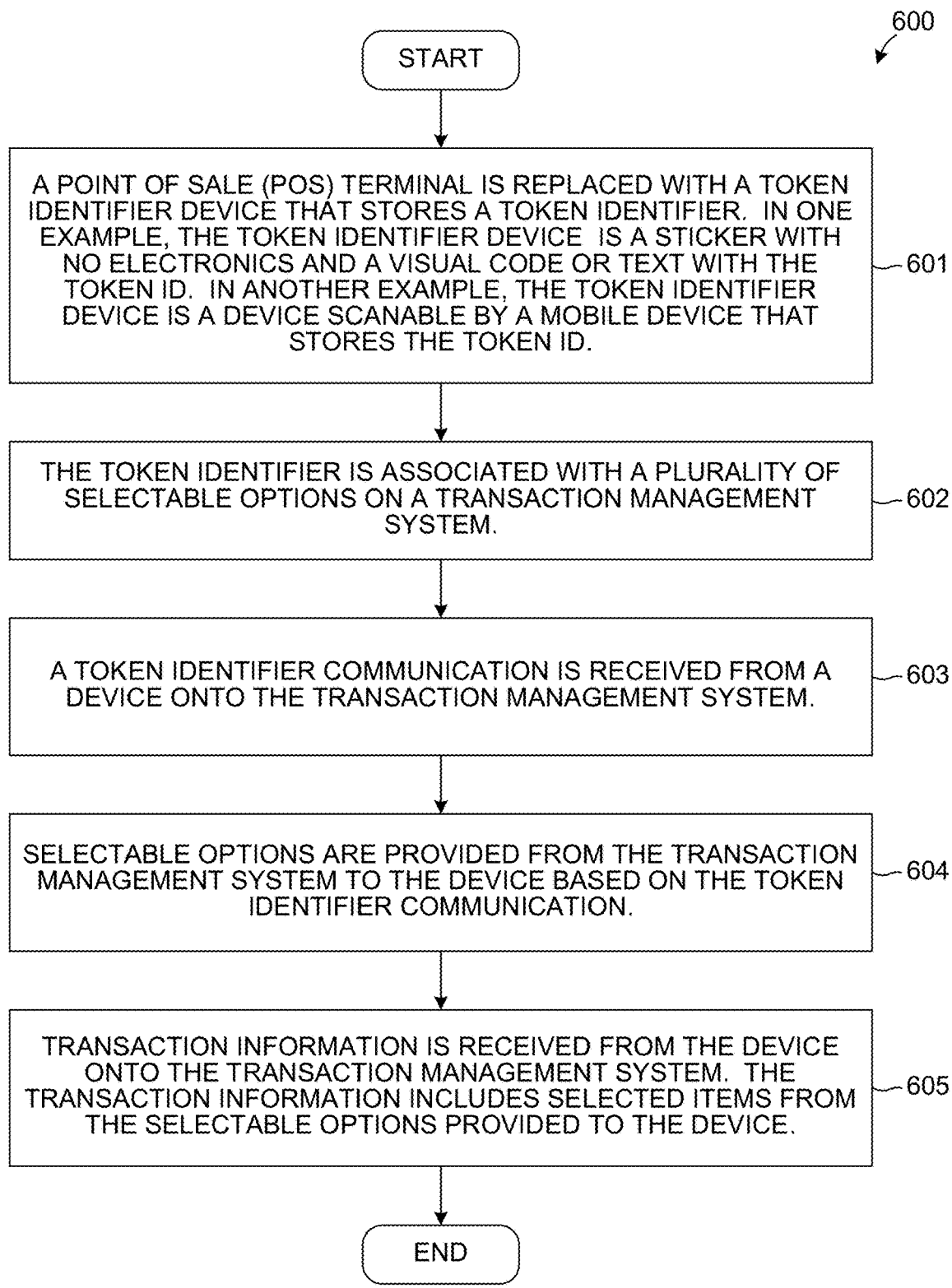
FIG. 22 is a flowchart of a method 600.

FIG. 22 is a flowchart of a method 600. The method 600 involves using a transaction management system to replace a point of sale (POS) terminal. POS terminals tend to be costly, space consuming, and have administrative and maintenance costs. It is common for service providers to be "offline" thereby disrupting their ability to accept payment and take new orders. Use of the novel method 600 significantly reduces costs associated with conventional POS terminals overcomes many operational problems associated with POS terminals.

In a first step (step 601), a point of sale (POS) terminal is replaced with a token identifier device that stores a token identifier. In one example, the token identifier device is a sticker with no electronics and a visual code or text with the token ID. In another example, the token identifier device is a device scannable by a mobile device that stores the token ID. In a second step (step 602), the token identifier is associated with a plurality of selectable options on a transaction management system. In a third step (step 603), a token identifier communication is received from a device onto the transaction management system. In a fourth step (step 604), selectable options are provided from the transaction management system to the device based on the token identifier communication. In a fifth step (step 605), transaction information is received from the device onto the transaction management system. The transaction information includes selected items from the selectable options provided to the device.

Although the present invention has been described in connection with certain specific embodiments for instructional purposes, the present invention is not limited thereto. For additional details on the structure on function of the system and method described above, see: U.S. provisional patent application Ser. No. 62/742,315, entitled "Transaction Management System Providing Payment Functionality Between Mobile Devices And Token Identifier Devices," filed on Oct. 6, 2018, and which is hereby incorporated by reference. Accordingly, various modifications, adaptations, and combinations of various features of the described embodiments can be practiced without departing from the scope of the invention as set forth in the claims.

What is claimed is:

1. A method comprising:
   activating a token identifier device using a mobile device, wherein in response to activating the token identifier device, the mobile device wirelessly obtains a token identifier stored in the token identifier device;
   communicating the token identifier from the mobile device to a transaction management system;
   receiving a menu of selectable options from the transaction management system onto the mobile device, wherein the menu of selectable options is presented as a Graphical User Interface (GUI) menu on a display of the mobile device, and wherein the transaction management system uses the token identifier to generate the menu of selectable options; and
   communicating transaction information from the mobile device to the transaction management system, wherein the transaction information includes one or more items selected from the GUI menu, wherein the mobile device is operated by a first entity, wherein the token identifier is associated with a second entity that provides a service to the first entity, wherein the second entity pre-configures the menu of selectable options on the transaction management system before the first entity activates the token identifier device using the mobile device and communicates the token identifier from the mobile device to the transaction management system, wherein the token identifier device is energized by the mobile device when the mobile device is within a pre-determined distance from the token identifier device and the mobile device outputs energy detected by the token identifier device, wherein the token identifier device is not coupled to any dedicated power source, wherein the token identifier device comprises a memory, a processor, and an antenna, wherein the memory stores the token identifier, and wherein the antenna is used to communicate the token identifier stored in the memory.

2. The method of claim 1, further comprising:
   receiving transaction confirmation from the transaction management system, wherein the transaction confirmation indicates whether a payment from the first entity to the second entity succeeded.

3. The method of claim 1, wherein the GUI menu of selectable options include items provided by the second entity.

4. The method of claim 1, further comprising:
receiving order confirmation indicating that the second entity has completed preparing the selected menu items and also indicating that the first entity is able to pick up the selected menu items.

5. The method of claim 1, wherein the only information communicated from the token identifier device to the mobile device is the token identifier.

6. The method of claim 1, wherein the first entity is a first user, a customer, or an employee or contractor of the second entity, and wherein the second entity is a second user or a service provider.

7. The method of claim 1, wherein the token identifier device is a passive Near Field Communication (NFC) token.

8. A method comprising:
energizing a token identifier device using a mobile device, wherein in response to energizing the token identifier device, the mobile device wirelessly obtains a token identifier stored in the token identifier device;
communicating the token identifier from the mobile device to a transaction management system;
presenting a Graphical User Interface (GUI) menu of selectable options on the mobile device, wherein the transaction management system receives the token identifier from the mobile device, obtains selectable options using the token identifier, and communicates to the mobile device the selectable options that are presented via the GUI menu;
detecting selection of one or more items presented via the GUI menu on the mobile device; and
communicating selected GUI menu items from the mobile device to the transaction management system, wherein the mobile device is operated by a first entity, wherein the token identifier is associated with a second entity that provides a service to the first entity, wherein the second entity pre-configures the menu of selectable options on the transaction management system before the first entity energizes the token identifier device using the mobile device and communicates the token identifier from the mobile device to the transaction management system, wherein the token identifier device is energized by the mobile device when the mobile device is within a pre-determined distance from the token identifier device and the mobile device outputs energy detected by the token identifier device, wherein the token identifier device is not coupled to any dedicated power source, wherein the token identifier device comprises a memory, a processor, and an antenna, wherein the memory stores the token identifier, and wherein the antenna is used to communicate the token identifier stored in the memory.

9. The method of claim 8, wherein the token identifier device is a passive Near Field Communication (NFC) token.

10. The method of claim 8, further comprising:
receiving transaction confirmation from the transaction management system, wherein the transaction confirmation indicates whether a payment from the first entity to the second entity succeeded.

11. The method of claim 8, wherein the GUI menu of selectable options include items provided by the second entity.

12. The method of claim 8, further comprising:
receiving order confirmation indicating that the second entity has completed preparing the selected menu items and also indicating that the first entity is able to pick up the selected menu items.

13. The method of claim 8, wherein the first entity is a first user, a customer, or an employee or contractor of the second entity, and wherein the second entity is a second user or a service provider.

14. A method comprising:
activating a token identifier device using a mobile device, wherein in response to activating the token identifier device, the mobile device wirelessly obtains a token identifier stored in the token identifier device;
communicating the token identifier from the mobile device to a transaction management system;
receiving a menu of selectable options from the transaction management system onto the mobile device, wherein the menu of selectable options is presented as a Graphical User Interface (GUI) menu on a display of the mobile device, and wherein the transaction management system uses the token identifier to generate the menu of selectable options; and
communicating transaction information from the mobile device to the transaction management system, wherein the transaction information includes one or more items selected from the GUI menu, wherein the mobile device is operated by a first entity, wherein the token identifier is associated with a second entity that provides a service to the first entity, wherein the second entity pre-configures the menu of selectable options on the transaction management system before the first entity activates the token identifier device using the mobile device, wherein the token identifier device is energized by the mobile device when the mobile device is within a distance from the token identifier device, wherein the token identifier device is not coupled to any dedicated power source, wherein the token identifier device comprises a memory, a processor, and an antenna, wherein the memory stores the token identifier, and wherein the antenna is used to communicate the token identifier stored in the memory.

15. The method of claim 14, wherein the token identifier device is a passive Near Field Communication (NFC) token.

16. The method of claim 14, further comprising:
receiving transaction confirmation from the transaction management system, wherein the transaction confirmation indicates whether a payment from the first entity to the second entity succeeded.

17. The method of claim 14, wherein the GUI menu of selectable options include items provided by the second entity.

18. The method of claim 14, further comprising:
receiving order confirmation indicating that the second entity has completed preparing the selected menu items and also indicating that the first entity is able to pick up the selected menu items.

19. The method of claim 14, wherein the first entity is a first user, a customer, or an employee or contractor of the second entity, and wherein the second entity is a second user or a service provider.

* * * * *